United States Patent
Sharma et al.

(10) Patent No.: US 7,313,461 B2
(45) Date of Patent: Dec. 25, 2007

(54) DATA CONNECTIVITY WITH A ROBOTIC DEVICE

(75) Inventors: Ratnesh K. Sharma, Union City, CA (US); Cullen E. Bash, San Francisco, CA (US); Chandrakant D. Patel, Fremont, CA (US); Gopalakrishnan Janakiraman, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 10/721,264

(22) Filed: Nov. 26, 2003

(65) Prior Publication Data

US 2005/0113978 A1    May 26, 2005

(51) Int. Cl.
  *G06F 19/00*  (2006.01)
(52) U.S. Cl. .................. 700/245; 700/276; 700/214; 700/246; 700/247; 700/248; 700/249; 700/254; 700/258; 700/259; 340/524; 340/501; 340/506; 340/584; 901/3; 901/46; 901/47; 318/567; 318/568.1
(58) Field of Classification Search .............. 700/259, 700/245, 246, 253, 257, 258, 279; 318/568.13, 318/568.15, 568.16, 640; 901/6, 14, 17, 901/46, 47; 29/218, 407.1, 702, 714, 720; 348/42, 94, 154, 190, 191, 287, 291, 552; 382/154

See application file for complete search history.

(56) References Cited

U.S. PATENT DOCUMENTS

| | | | | |
|---|---|---|---|---|
| 5,596,507 A  * | 1/1997 | Jones et al. | ................... | 700/276 |
| 6,694,759 B1 * | 2/2004 | Bash et al. | .................... | 62/180 |
| 7,031,802 B2 * | 4/2006 | Bash et al. | ................. | 700/214 |
| 7,072,739 B2 * | 7/2006 | Bash et al. | ................. | 700/245 |
| 7,170,745 B2 * | 1/2007 | Bash et al. | ................. | 361/695 |

\* cited by examiner

*Primary Examiner*—Thomas Black
*Assistant Examiner*—McDieunel Marc

(57) ABSTRACT

A method for data connectivity in a room with a robotic device. In the method, at least one condition is detected with a plurality of sensors and the detected at least one condition is communicated from the sensors to associated access points. One or more of the access points are selected and the robotic device is maneuvered to a location in a vicinity of one or more of the selected access points. The detected at least one condition is communicated from one or more of the selected access points to the robotic device. In addition, the robotic device is maneuvered to a location in a vicinity of a base station and the detected at least one condition is communicated from the robotic device to the base station.

50 Claims, 7 Drawing Sheets

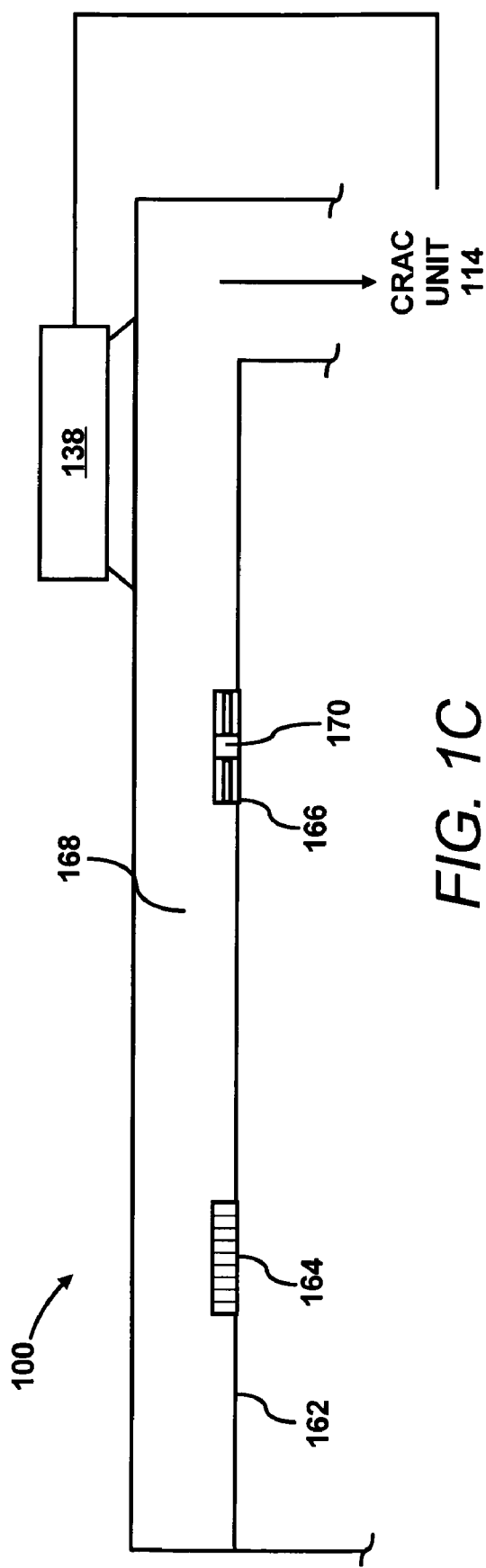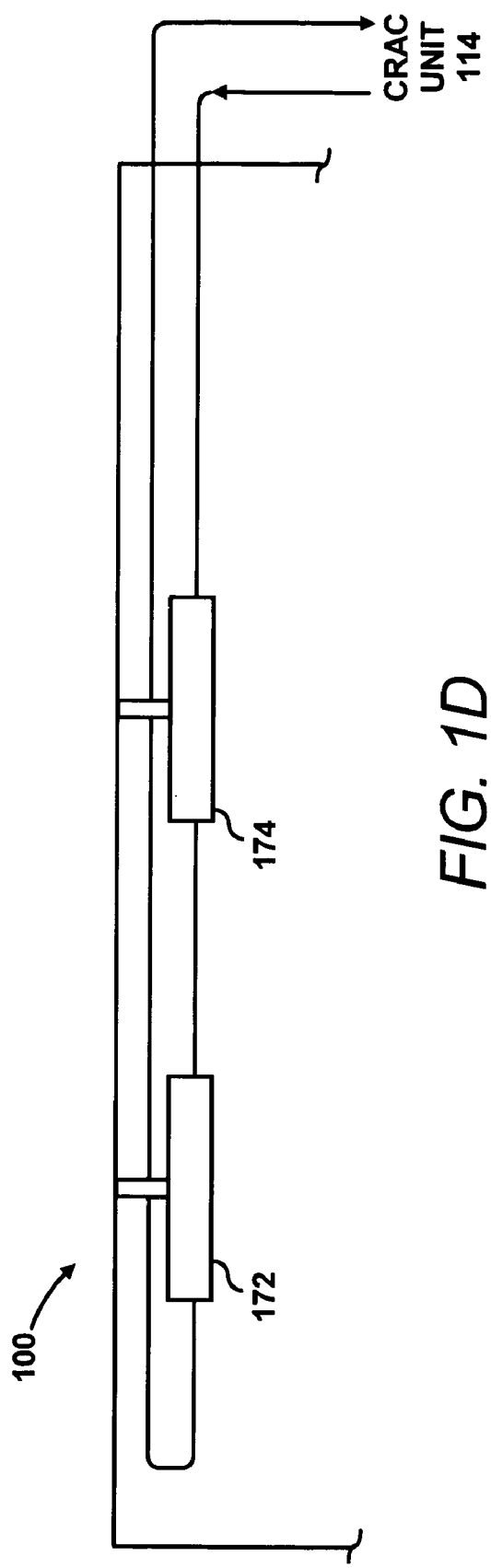

DATA CONNECTIVITY WITH A ROBOTIC DEVICE

BACKGROUND OF THE INVENTION

A data center may be defined as a location, e.g., room, that houses computer systems arranged in a number of racks. A standard rack, e.g., electronics cabinet, is defined as an Electronics Industry Association (EIA) enclosure, 78 in. (2 meters) high, 24 in. (0.61 meter) wide and 30 in. (0.76 meter) deep. These racks are configured to house a number of computer systems, e.g., about forty (40) systems, with future configurations of racks being designed to accommodate up to eighty (80) systems. The computer systems typically include a number of components, e.g., one or more of printed circuit boards (PCBs), mass storage devices, power supplies, processors, micro-controllers, semi-conductor devices, and the like, that may dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

The power required to transfer the heat dissipated by the components in the racks to the cool air contained in the data center is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling fluid, e.g., air, cooling fluid, etc., across the heat dissipating components; whereas, data centers often implement reverse power cycles to cool heated return air. The additional work required to achieve the temperature reduction, in addition to the work associated with moving the cooling fluid in the data center and the condenser, often add up to the 50 percent power requirement. As such, the cooling of data centers presents problems in addition to those faced with the cooling of the racks.

Conventional data centers are typically cooled by operation of one or more air conditioning units. For example, compressors of air conditioning units typically consume a minimum of about thirty (30) percent of the required operating energy to sufficiently cool the data centers. The other components, e.g., condensers, air movers (fans), etc., typically consume an additional twenty (20) percent of the required total operating energy. As an example, a high density data center with 100 racks, each rack having a maximum power dissipation of 10 KW, generally requires 1 MW of cooling capacity. Air conditioning units with a capacity of 1 MW of heat removal generally requires a minimum of 300 KW input compressor power in addition to the power needed to drive the air moving devices, e.g., fans, blowers, etc. Conventional data center air conditioning units do not vary their cooling fluid output based on the distributed needs of the data center. Instead, these air conditioning units generally operate at or near a maximum compressor power even when the heat load is reduced inside the data center.

The substantially continuous operation of the air conditioning units is generally designed to operate according to a worst-case scenario. For example, air conditioning systems are typically designed around the maximum capacity and redundancies are utilized so that the data center may remain on-line on a substantially continual basis. However, the computer systems in the data center may only utilize around 30-50% of the maximum cooling capacity. In this respect, conventional cooling systems often attempt to cool components that may not be operating at a level which may cause their temperatures to exceed a predetermined temperature range.

Consequently, conventional cooling systems often incur greater amounts of operating expenses than may be necessary to sufficiently cool the heat generating components contained in the racks of data centers.

Another problem associated with the cooling of data centers involves the expense and difficulty in measuring the environmental conditions, e.g., temperature, humidity, air flow, etc., within and around the racks. Although it has been found that the use of temperature sensors, e.g., thermocouples, located at various locations throughout the data center has been a relatively accurate manner of detecting temperatures, this practice has also been found to be relatively restrictive due to the difficulty and costs associated with this implementation. A relatively large number of sensors typically must be implemented to adequately detect the environmental conditions throughout the data center. In addition, these sensors are typically configured to substantially continuously transmit detected conditions to a controller. One result of the use of a relatively large number of sensors is that they produce an extremely large amount of data. The transmission of this data to the controller typically requires a great deal of bandwidth and processing power, which are typically associated with high operating costs.

The sensors are typically wired to a power source and to a network for transmitting information. Therefore, when the data center layout changes, e.g., racks or components are added, removed or re-arranged, the sensors must also be re-wired. Because data centers are known to include a large number of sensors, re-wiring the sensors requires a great deal of time and manual input which are associated with relatively high operating costs.

One way to alleviate some of the time and costs associated with changing the data center layout has been through the use of wireless sensor arrays. However, there are certain drawbacks associated with the use of sensor arrays that wirelessly transmit information. For instance, the information may be transmitted to locations outside of the data center and therefore may be intercepted by outside systems. This may occur because the sensors may be calibrated to transmit signals to a system located relatively distant from the sensor locations, e.g., across a relatively large data center.

Another drawback to the use of certain known wireless sensors is the costs associated with their implementation and operation. Wireless sensors capable of transmitting information a distance sufficient to reach a desired location in the data center are typically expensive and complicated. In addition, these sensors typically require relatively large amounts of power during their operations.

SUMMARY OF THE INVENTION

According to an embodiment, the present invention pertains to a method for data connectivity in a room with a robotic device. In the method, at least one condition is detected with a plurality of sensors and the detected at least one condition is communicated from the sensors to associated access points. One or more of the access points are selected and the robotic device is maneuvered to a location in a vicinity of one or more of the selected access points. The detected at least one condition is communicated from one or more of the selected access points to the robotic device. In addition, the robotic device is maneuvered to a location in a vicinity of a base station and the detected at least one condition is communicated from the robotic device to the base station.

According to another embodiment, the invention relates to a system for data connectivity in a room with a robotic device. The system includes a plurality of sensors configured to detect at least one condition positioned in various locations in the room. The system also includes a plurality of access points associated with one or more of the sensors located in respective vicinities of the plurality of access points. The plurality of access points are configured to receive the detected at least one condition from the associated one or more sensors. A robotic device is configured to traverse the room and to receive the detected at least one condition from the plurality of access points when the robotic device is in the vicinities of respective ones of the plurality of access points. The system further includes a base station configured to communicate with the robotic device when the robotic device is in a vicinity of the base station.

According to a further embodiment, the present invention relates to a system for data connectivity in a room. The system includes means for detecting at least one condition; means for communicating the detected at least one condition to associated access points; means for selecting one or more access points; means for collecting information, the means for collecting information comprising means for maneuvering the means for collecting information to a location in a vicinity of one or more of the selected access points; means for communicating the detected at least one condition from one or more of the selected access points to the means for collecting information; the means for collecting information further comprising means for maneuvering the means for collecting information to a location in a vicinity of a means for controlling the room; and means for communicating the detected at least one condition from the means for collecting information to the means for controlling the room.

According to yet another embodiment, the invention relates to a computer readable storage medium on which is embedded one or more computer programs. The one or more computer programs implement a method for data connectivity in a room with a robotic device according to embodiments of the present invention.

BRIEF DESCRIPTION OF THE DRAWINGS

Features of the present invention will become apparent to those skilled in the art from the following description with reference to the figures, in which:

FIG. 1C is a cross-sectional side view of an upper portion of the room shown in FIGS. 1A and 1B according to an embodiment of the invention;

FIG. 1D is across-sectional side view of an upper portion of the room shown in FIGS. 1A and 1B according to a further embodiment of the invention;

DETAILED DESCRIPTION OF THE INVENTION

Figure 1A:
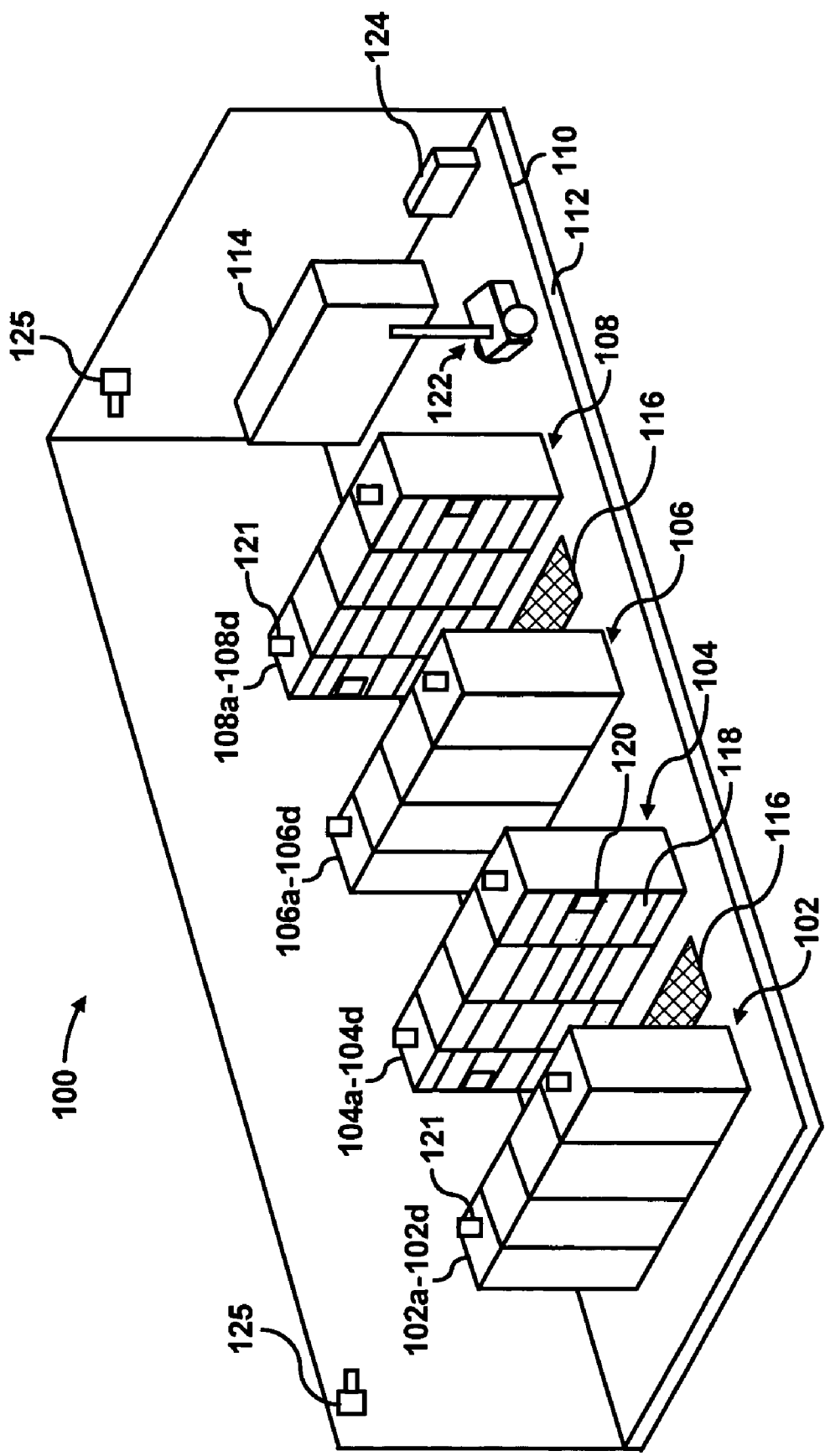
FIG. 1A shows a simplified perspective view of a room, e.g., a data center, according to an embodiment of the invention.

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Throughout the present disclosure, reference is made to "cooling fluid" and "heated cooling fluid". For purposes of simplicity, "cooling fluid" may generally be defined as air that has been cooled by a cooling device, e.g., an air conditioning unit. In addition, "heated cooling fluid" may generally be defined as cooling fluid that has been heated. It should be readily apparent, however, that the terms "cooling fluid" are not intended to denote air that only contains cooled fluid and that "heated cooling fluid" only contains cooling fluid that has been heated.

Instead, embodiments of the invention may operate with air that contains a mixture of heated cooling fluid and cooling fluid. In addition, cooling fluid and heated cooling fluid may denote gases other than air, e.g., refrigerant and other types of gases known to those of ordinary skill in the art that may be used to cool electronic components.

According to embodiments of the invention, a room, e.g., a data center, may be divided into various zones. The zones may be determined based upon, for example, the delivery of cooling provisions, the layout of the data center, etc. In addition, the zones may include a single rack, multiple racks, or portions of individual or multiple racks. The zones may be provided with access points configured to receive information from sensors located in their respective zones.

The access points may comprise any reasonably suitable software or hardware device capable of receiving, storing and transmitting information. In this regard, the access points may comprise separate computer systems or servers. In addition or alternatively, the access points may comprise software stored in existing computer systems or servers housed in the racks. The access points may also be configured with a communication system to enable information transfer between the access points and another device, e.g., a robotic device. The communication system may be configured to enable information transfer to relatively short distances, e.g., within approximately 1-4 feet, with respect to the access points.

The sensors may include environmental condition sensors as well as sensors designed to detect the placement or removal of components in racks, e.g., infrared sensors (IR). The sensors may be configured to communicate with respective access points through a wired or wireless connection. In addition, the sensors may be configured to communicate with a plurality of access points to, for instance, provide redundancy in the data collected by the access points. If sensors are configured to communicate with the data access points wirelessly, the sensors may also be configured to have relatively short transmission ranges. For instance, the transmission ranges may be limited to the vicinities of the respective zones.

According to another embodiment of the invention, a robotic device is employed to provide connectivity between the access points and a base station, e.g., a computer system, configured to track and/or implement changes in data center operations. In supplying the connectivity, the robotic device may be configured to traverse the room and to communicate with the access points and the base station. Communication between the robotic device and the access points may be effectuated when the robotic device is in relatively close proximity, e.g., within approximately 1 to 4 feet, to the access points. In addition, these communications may be executed wirelessly or through a wired connection between the robotic device and the access points.

The information communicated from the sensors to the access points and to the robotic device may comprise at least one environmental condition and/or may be implemented to update an inventory of the components contained in the room. In addition, the robotic device is configured to travel to the vicinity of a base station and to communicate the information to the base station. Communications between the robotic device and the base station may be effectuated when the robotic device is within, for instance, approximately 1-4 feet. The base station may comprise a computer system designed to perform a plurality of functions based, in part, upon the information received from the robotic device. For instance, the base station may employ the at least one environmental condition information in controlling the cooling provisions delivered to various sections of the room. As another example, the base station may update an inventory of the components in the room based upon information received from the robotic device.

The base station may also function as a charging station for the robotic device. In this regard, the base station may include components for charging the robotic device and the robotic device may include components for receiving the charge from the base station. In addition, the base station may function to devise routes through the room the robotic device is to follow during, for instance, an information gathering session from the data access points. In another embodiment, the robotic device may devise its own routes through the data center.

According to further embodiments of the invention, the access points may include signal devices, e.g., beacons, configured to transmit or emit a signal, for instance, when the access points receive information that the access points are to transmit to the robotic device. These signal devices may include visual, auditory or electronic signals. The robotic device may be configured to detect these signals, e.g., through a camera, auditory device, etc. In addition or alternatively, one or more cameras may be positioned at various locations of the data center. The one or more cameras may be configured to detect the signals indicated by the access points and transmit the indication to the base station and/or the robotic device. The robotic device may then be instructed to travel to the access point(s) that indicated that it contains information to be transferred to the robotic device.

Through implementation of various embodiments of the invention, information pertaining to various aspects of a room may be communicated effectively and in a secure manner. In one respect, a robotic device may be employed to provide connectivity between the various access points and a base station in the room. Therefore, data from the access points or the sensors need not be transmitted across relatively large distances for the information to be received by the base station. In one respect, the data may be communicated while substantially avoiding issues related to security problems, e.g., data interception. In addition, the access points or the sensors also need not be wired to the base station. In one regard, the amount of time and the costs associated with operating a room containing electronic components may thus be reduced compared with conventional systems.

With reference first to FIG. 1A, there is shown a simplified perspective view of a room 100, e.g., a data center, according to an embodiment of the invention. The terms "data center" are generally meant to denote a room or other space and are not meant to limit the invention to any specific type of room where data is communicated or processed, nor should it be construed that use of the terms "data center" limits the invention in any respect other than its definition hereinabove.

The room 100 depicted in FIG. 1A represents a generalized illustration and other components may be added or existing components may be removed or modified without departing from the scope of the invention. For example, the room 100 may include any number of racks and various other apparatuses known to be housed in data centers. Thus, although the room 100 is illustrated as containing four rows of racks 102-108, it should be understood that the room 100 may include any number of racks, e.g., 100 racks, without departing from the scope of the invention. The depiction of four rows of racks 102-108 is thus for illustrative and simplicity of description purposes only and is not intended to limit the invention in any respect.

The room 100 is depicted as having a plurality of racks 102-108, e.g., electronics cabinets, aligned in substantially parallel rows. The racks 102-108 are illustrated as having open front sides such that the components 118 housed therein are visible. It should, however, be understood that embodiments of the invention may be practiced with racks having panels that cover the front sides of the racks 102-108 without departing from the scope of the invention. The rows of racks 102-108 are shown as containing four racks (a-d) positioned on a raised floor 110. A plurality of wires and communication lines (not shown) may be located in a space 112 beneath the raised floor 110. The space 112 may also function as a plenum for delivery of cooling fluid from a computer room air conditioner (CRAC) 114 to the racks 102-108. The cooling fluid may be delivered from the space 112 to the racks 102-108 through vent tiles 116 located between some or all of the racks 102-108. The vent tiles 116 are shown in FIG. 1A as being located between racks 102 and 104 and 106 and 108.

The racks 102-108 are generally configured to house a plurality of components 118, e.g., computers, servers, monitors, hard drives, disk drives, etc., designed to perform various operations, e.g., computing, switching, routing, displaying, etc. These components 118 may comprise subsystems (not shown), for example, processors, micro-controllers, high-speed video cards, memories, semi-conductor devices, and the like to perform these functions. In the performance of these electronic functions, the components 118, and therefore the subsystems, generally dissipate relatively large amounts of heat. Because the racks 102-108 have generally been known to include upwards of forty (40) or more subsystems, they may transfer substantially large amounts of heat to the cooling fluid to maintain the subsystems and the components 118 generally within predetermined operating temperature ranges.

A relatively small number of components 118 are illustrated as being housed in the racks 102-108 for purposes of simplicity. It should, however, be understood that the racks 102-108 may include any number of components 118, e.g., forty or more components 118, without departing from the scope of the invention. In addition, although the racks 102-108 are illustrated as containing components 118 throughout the heights of the racks 102-108, it should be understood that some or all of the racks 102-108 may include slots or areas that do not include components 118 without departing from the scope of the invention.

According to an embodiment of the invention, a plurality of access points 120 are provided at various locations of the room 100. As shown in FIG. 1A, the access points 120 are illustrated as being positioned at various locations in the racks 102-108. It should however, be understood that the access points 120 may be positioned at various other locations of the room 100 without departing from the scope of the invention. For instance, one or more of the access points 120 may be located at various other locations with respect to the racks 102-108, e.g., the tops, sides, and the bottoms. In addition, the access points 120 may be positioned in respective zones within the room 100. The zones may be assigned in any reasonably suitable manner. For instance, the zones may comprise the racks 102-108 that receive cooling fluid from the same CRAC 114, the racks 102-108 that receive cooling fluid from the same vent 116, the racks 102-108 in the same row, a group of racks 102-108 in the same row, individual racks 102-108, etc.

The access points 120 may generally comprise gateways for information obtained by a plurality of sensors (not shown) to be compiled and for the compiled information to be conveyed to a robotic device 122. In this regard, the access points 120 may comprise computers, servers, or other devices capable of performing these functions. In addition, existing servers or computers contained in the racks 102-108 may perform the functions of the access points 120.

The access points 120 may be connected to signal devices 121. The signal devices 121 may be configured to emit a visual, e.g., a light, or auditory, e.g., an alarm, a signal, etc., or other signal. In one respect, the access points 120 may operate the signal devices 121 to emit a signal when the access points 120 obtain certain information from one or more of the sensors. This information may pertain to, for instance, a relatively large change in temperature, additional or removed components, or other information pertinent to operating the components housed in the room.

The sensors of a particular zone may be configured to communicate with an access point 120 associated with that zone. In addition, the sensors may be configured to communicate with a plurality of access points 120 to, for instance, provide redundancy and because certain zones may overlap with one another. The communications between the sensors and the access points 120 may be effectuated through a wired protocol, such as IEEE 802.3, etc., or wireless protocols, such as IEEE 801.11b, 801.11g, wireless serial connection, Bluetooth, etc., or combinations thereof. If a wireless protocol is implemented, the sensors employed may be selected such that they are capable of transmitting signals to relatively short distances, e.g., within their respective zones. Alternatively, if the sensors are capable of transmitting to greater distances, the sensors may be configured or otherwise programmed to transmit signals to the relatively short distances, e.g., within their respective zones, within approximately 1-4 feet, etc. In this regard, the sensors may be operated in manners such that their signals are substantially prevented from being transmitted to locations outside of the room 100.

Also illustrated in FIG. 1A is a robotic device 122 configured to traverse the room 100. In this regard, the robotic device 122 includes means to enable the robotic device 122 to travel to various areas of the room 100. The robotic device 122 may comprise a configuration and operate in manners similar to those described in co-pending and commonly assigned U.S. patent application Ser. No. 10/446,867 filed on May 29, 2003, and entitled "DATA CENTER ROBOTIC DEVICE". The disclosure contained in that application is hereby incorporated by reference in its entirety. Additional components associated with the robotic device 122 are described in greater detail hereinbelow.

The robotic device 122 is generally configured to communicate with the access points 120. Communications between the robotic device 122 and the access points 120 may occur when the robotic device 122 is in relatively close proximity to the access points 120, e.g., within around 1-4 feet. Moreover, communications between the robotic device 122 and the access points 120 may be effectuated through a wired protocol, such as IEEE 802.3, etc., or wireless protocols, such as IEEE 801.11b, 801.11g, wireless serial connection, Bluetooth, etc., or combinations thereof. If a wired protocol is implemented, the robotic device 122 may include an interface device configured to create a hardwire connection to the access points 120. If a wireless protocol is implemented, the access points 120 may be configured or otherwise programmed to transmit signals to a relatively short distance, e.g., within a few feet. In this regard, the access points 120 may be operated in manners such that their signals are substantially prevented from being transmitted to locations outside of the room 100.

The robotic device 122 is also configured to communicate with a base station 124, e.g., a computer system, an energy manager, etc., configured to, for instance, control the operations of various cooling system components. The communications between the base station 124 and the robotic device 122 may also include transmission or downloading of information obtained by the robotic device 122 from the access points 120. This information may pertain to one or more environmental conditions detected by the sensors and transmitted to the access points 120. The various cooling system components may comprise the vents 116, the CRAC 114, devices for substantially controlling the flow of cooling fluid into the racks 102-108, e.g., those devices described in co-pending and commonly assigned U.S. patent application Ser. Nos. 10/425,621 and 10/425,624, both of which were filed on Apr. 30, 2003, the disclosures of which are hereby incorporated by reference in their entireties, etc. In this regard, the base station 124 may control the operations of one or more of the cooling system components in response to the information received on the robotic device 122.

The information transferred from the robotic device 122 to the base station 124 may also include information pertaining to an inventory of the components housed in the room 100. For instance, some or all of the sensors may comprise sensors designed to detect changes in the components housed in the racks 102-108. These sensors may comprise, e.g., infrared devices configured to determine whether a component has been added or removed from a particular location in the racks 102-108. These sensors may also comprise sensors designed to interface with the components and to determine their identities, e.g., their IP addresses, serial numbers, etc. In any respect, these sensors may communicate information pertaining to addition or removal of components to their associated access points 120. The access points 120 may then communicate this information to the robotic device 122 which may also communicate this information to the base station 124. The base station 124 may utilize the inventory information received from the robotic device 122 to create or update an inventory of the components housed in the room 100.

Communications between the base station 124 and the robotic device 122 may include communication of instructions from the base station 124 to the robotic device 122. These communications or instructions may include, the routes in which the robotic device 122 is to follow in the room 100. The routing algorithms employable by the robotic device 122 are described in greater detail hereinbelow.

The base station 124 may also include systems for recharging a battery of the robotic device 122. In one respect, the base station 124 may include a charging pad and the robotic device 122 may include conductive elements configured to engage the charging pad and to receive electrical charge therethrough. The robotic device 122 may thus be configured to travel to the base station 124 to both communicate with the base station 124 and to recharge its battery. In addition, communications between the robotic device 122 and the base station 124 may be effectuated through a wired protocol, such as IEEE 802.3, etc., or wireless protocols, such as IEEE 801.11b, 801.11g, wireless serial connection, Bluetooth, etc., or combinations thereof. If a wired protocol is implemented, the robotic device 122 may include an interface device configured to create a hardwire connection to the base station 124. If a wireless protocol is implemented, the robotic device 122 and the base station 124 may be configured or otherwise programmed to transmit signals to relatively short distances, e.g., within a few feet. In this regard, wireless communications between the robotic device 122 and the base station 124 may be effectuated in manners such that their signals are substantially prevented from being transmitted to locations outside of the room 100, therefore reducing the possibilities of unwanted signal interceptions.

According to an embodiment of the invention, a plurality of cameras 125 may be deployed at various locations of the room 100. The cameras 125 may be provided to detect signals indicated by the signal devices 121. The cameras 125 may also communicate detection of signals to the base station 124 and/or the robotic device 122. The robotic device 122 may therefore be configured to travel to the vicinities of various access points 120 in response to receipt of the signals.

In addition, the sensors, access points 120, base station 124, cameras 125, etc., may comprise components that are retrofitted into existing rooms. In this regard, these components may generally enable additional monitoring and control over conditions in rooms having existing networking configurations.

Figure 1B:
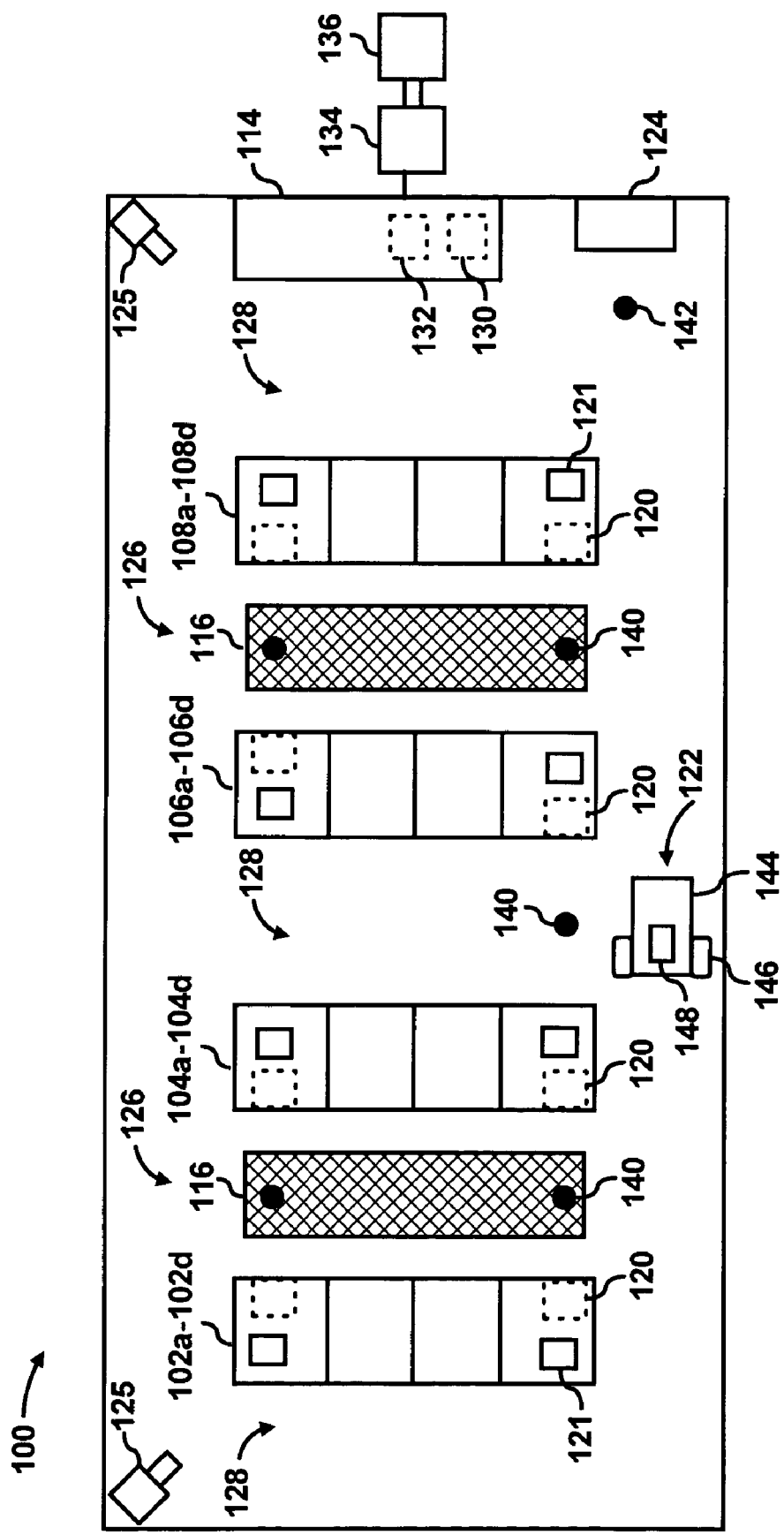
FIG. 1B shows a simplified illustration of a plan view of the room shown in FIG. 1A, according to an embodiment of the invention.

With reference now to FIG. 1B, there is shown a simplified illustration of a plan view of the room 100 shown in FIG. 1A, according to an embodiment of the invention. The areas between the racks 102 and 104 and between the racks 106 and 108 may comprise cool aisles 126. These aisles are considered "cool aisles" because they are configured to receive cooling fluid from the vents 116. In addition, the racks 102-108 are positioned to receive cooling fluid from the cool aisles 124. The aisles between the racks 104 and 106, and on the rear sides of racks 102 and 108, are considered hot aisles 128. These aisles are considered "hot aisles" because they are positioned to receive cooling fluid heated by the components 118 in the racks 102-108.

The sides of the racks 102-108 that face the cool aisles 126 may be considered as the fronts of the racks 102-108 and the sides of the racks 102-108 that face away from the cool aisles 126 may be considered as the rears of the racks 102-108. For purposes of simplicity and not of limitation, this nomenclature will be relied upon throughout the present disclosure to describe the various sides of the racks 102-108.

As described hereinabove, the CRAC 114 receives and cools heated cooling fluid. In addition, the CRAC 114 supplies the racks 102-108 with cooling fluid that has been cooled, e.g., cooled or chilled air, through, for example, a process as described below. The CRAC 114 generally includes a fan 130 (shown in outline) for supplying cooling fluid (e.g., air) into the space 112 (e.g., plenum) and/or drawing heated cooling fluid from the room 100. In operation, the heated cooling fluid enters into the CRAC 114 and is generally cooled by operation of a cooling coil 132, a compressor 134, and a condenser 136, in a manner generally known to those of ordinary skill in the art. In terms of cooling system efficiency, it is generally desirable that the return air is composed of the relatively warmest portion of air in the room 100.

Although reference is made throughout the present disclosure of the use of a fan 130 to draw heated cooling fluid from the room 100, it should be understood that any other reasonably suitable manner of cooling fluid removal may be implemented without departing from the scope of the invention. By way of example, a separate fan or blower (not shown) may be employed to draw heated cooling fluid from the room 100.

In addition, based upon the cooling fluid needed to cool the heat loads in the racks 102-108, the CRAC 114 may be operated at various levels. For example, the capacity of the compressor 134 (e.g., the rate of work done by the compressor) and/or the speed of the fan 130 may be modified to thereby control the temperature and the amount of cooling fluid flow delivered to the racks 102-108. In this respect, the compressor 134 employed in the CRAC 114 may comprise a variable capacity compressor and the fan 130 may comprise a variable speed fan. The compressor 134 may thus be controlled to either increase or decrease the mass flow rate of a refrigerant therethrough.

Because the specific type of compressor 134 and fan 130 to be employed with embodiments of the invention may vary according to individual needs, the invention is not limited to any specific type of compressor or fan. Instead, any reasonably suitable type of compressor 134 and fan 130 capable of accomplishing certain aspects of the invention may be employed with embodiments of the invention. The choice of compressor 134 and fan 130 may therefore depend upon a plurality of factors, e.g., cooling requirements, costs, operating expenses, etc.

In addition, embodiments of the invention may be operated with constant speed compressors and/or constant speed fans. In one respect, control of cooling fluid delivery to the racks 102-108 may be effectuated based upon the pressure of the cooling fluid in the space 112. According to this embodiment, the pressure within the space 112 may be controlled through operation of, for example, a plurality of vents 116 positioned at various locations in the room 100. That is, the pressure within the space 112 may be kept essentially constant throughout the space 112 by selectively controlling the output of cooling fluid through the vents 116. By way of example, if the pressure of the cooling fluid in one location of the space 112 exceeds a predetermined level, a vent located substantially near that location may be caused to enable greater cooling fluid flow therethrough to thereby decrease the pressure in that location. A more detailed description of this embodiment may be found in U.S. application Ser. No. 10/303,761, filed on Nov. 26, 2002 and U.S. application Ser. No. 10/351,427, filed on Jan. 27, 2003, which are assigned to the assignee of the present invention and are hereby incorporated by reference in their entireties.

In addition, or as an alternative to the compressor 134, a heat exchanger (not shown) may be implemented in the CRAC 114 to cool the fluid supply. The heat exchanger may comprise a chilled water heat exchanger, a centrifugal chiller (e.g., a chiller manufactured by YORK), and the like, that generally operates to cool air as it passes over the heat exchanger. The heat exchanger may comprise a plurality of air conditioners. The air conditioners may be supplied with water driven by a pump and cooled by a condenser or a cooling tower. The heat exchanger capacity may be varied based upon heat dissipation demands. Thus, the heat exchanger capacity may be decreased where, for example, it is unnecessary to maintain the cooling fluid at a relatively low temperature.

In operation, cooling fluid generally flows from the fan 130 into the space 112. The cooling fluid flows out of the raised floor 110 and into various areas of the racks 102-108 through the plurality of vents 116. The vents 116 may comprise the dynamically controllable vents disclosed and described in U.S. Pat. No. 6,574,104. As described in that application, the vents 116 are termed "dynamically controllable" because they generally operate to control at least one of velocity, volume flow rate and direction of the cooling fluid therethrough. In addition, specific examples of dynamically controllable vents 116 may be found in co-pending U.S. application Ser. No. 10/375,003, filed on Feb. 28, 2003, which is assigned to the assignee of the present invention and is incorporated by reference herein in its entirety.

As the cooling fluid flows out of the vents 116, the cooling fluid may flow into the racks 102-108. The racks 102-108 generally include inlets (not shown) on their front sides to receive the cooling fluid from the vents 116. The inlets generally comprise one or more openings to enable the cooling fluid to enter the racks 102-108. In addition, or alternatively, the front sides of some or all of the racks 102-108 may comprise devices for substantially controlling the flow of cooling fluid into the racks 102-108. Examples of suitable devices are described in co-pending and commonly assigned U.S. patent application Ser. Nos. 10/425,621 and 10/425,624, both of which were filed on Apr. 30, 2003, the disclosures of which are hereby incorporated by reference in their entireties.

The cooling fluid may become heated by absorbing heat dissipated from the components 118 located in the racks 102-108 as it flows through and around the racks 102-108. The heated cooling fluid may generally exit the racks 102-108 through one or more outlets located on the rear sides of the racks 102-108. In addition, or alternatively, the rear sides of some or all of the racks 102-108 may comprise devices for substantially controlling the flow of cooling fluid into the racks 102-108 and/or controlling the flow of heated cooling fluid out of the racks 102-108. Again, examples of suitable devices are described in co-pending and commonly assigned U.S. patent application Ser. Nos. 10/425,621 and 10/425,624.

The flow of air through the racks 102-108 may substantially be balanced with the flow of air through the vents 116 through operation of the above-described devices in manners consistent with those manners set forth in the above-identified co-pending applications. In addition, a proportional relationship may be effectuated between the airflow through the racks 102-108 and the vents 116. By virtue of controlling the airflow in the manners described in those co-pending applications, the level of re-circulation between the heated cooling fluid flow and the cooling fluid may substantially be reduced or eliminated in comparison with known cooling systems.

The CRAC 114 may vary the amount of cooling fluid supplied to the racks 102-108 as the cooling requirements vary according to the heat loads in the racks 102-108, along with the subsequent variations in the volume flow rate of the cooling fluid. As an example, if the heat loads in the racks 102-108 generally increases, the CRAC 114 may operate to increase supply of the cooling fluid. In addition, the CRAC 114 may decrease the temperature of the cooling fluid.

Alternatively, if the heat loads in the racks 102-108 generally decreases, the CRAC 114 may operate to decrease supply of the cooling fluid. In addition, the CRAC 114 may increase the temperature of the cooling fluid. In this regard, the amount of energy utilized by the CRAC 114 to generally maintain the components in the room 100 within predetermined operating temperature ranges may substantially be optimized.

As an alternative, there may arise situations where the additional cooling fluid flow to the racks 102-108 causes the temperatures of the components to rise. This may occur, for example, when a relatively large amount of heated cooling fluid is re-circulated into the cooling fluid. In this situation, cooling fluid delivery may be reduced in response to increased component temperatures. In addition, cooling fluid delivery may be increased in response to decreased component temperatures. It should therefore be understood that the present invention is not limited to one operational manner as temperatures in the room 100 vary.

Through operation of the vents 116, the above-described devices, and the CRAC 114, global and zonal control of the cooling fluid flow and temperature may substantially be achieved. For instance, the flow regulating devices, e.g., louver systems and angled panels, generally provide local or rack level control of cooling fluid flow and the vents 116 generally provide localized or zonal control of the cooling fluid flow to one or more of the racks 102-108. In addition, the CRAC 114 generally provides global control of the cooling fluid flow and temperature, e.g., cooling fluid having various characteristics to a plurality of racks, throughout various portions of the room 100. By virtue of the zonal and global control of the cooling fluid, the amount of energy consumed by the CRAC 114 in maintaining the components of the racks 102-108 within predetermined operating temperature ranges may substantially be reduced in comparison with conventional data center cooling systems.

As stated hereinabove, the base station 124 is configured to control the operations of the vents 116, CRAC 114, and the flow regulating devices (if applicable). In controlling the operations of these cooling system components, the base station 124 may employ information received from the robotic device 122.

A plurality of access point download locations 140 and a base station download location 142 are illustrated in FIG. 1B. It should be understood that the download locations 140 and 142 are merely reference points depicted for illustration purposes only and may therefore not constitute actual devices or markings in the room 100. In addition, the positions of the download locations 140 and 142 are also for illustrative purposes only and may therefore be positioned at various other locations in the room 100.

In operation, the robotic device 122 may travel to various ones of the download locations 140 and 142 and communicate with respective access points 120. The communication between the robotic device 122 and the access points 120 may include transfer of data pertaining to, for instance, temperature measurements transmitted to the access points 120 from associated sensors. As another example, the communication may include information pertaining to an inventory of components housed in the associated areas of the access points 120.

In one respect, the robotic device 122 is generally composed of a vehicle base 144 having a plurality of wheels 146 to enable travel of the robotic device 122 through the room 100. An arm 148 may be attached to the vehicle base 144. The arm 148 may be designed to rotate and may be maneuverable into various positions with respect to the vehicle base 144, for example, with six or more degrees of freedom. A variety of components and/or devices, e.g., sensors, cameras, manipulators, interface devices, etc., may be attached at various locations of the arm 148.

Although the arm 148 of the robotic device 122 has been described as being movable, the arm 148 may be relatively static with respect to the vehicle base 144 without departing from the scope of the invention. In addition, the robotic device 122 may be configured without an arm or with a retractable arm.

FIG. 1C is a cross-sectional side view of an upper portion of the room 100 according to an embodiment of the invention. According to this embodiment, the room 100 may include a lowered ceiling 162. Dynamically controllable returns 164 and 166 may be situated along the lowered ceiling 162 to generally enable controlled removal of heated cooling fluid from the room 100. To facilitate removal of heated cooling fluid from the room 100, the returns 164 and 166 may include a fan 170. A more detailed description of the returns 164 and 166 and manners of their operability may be found in co-pending U.S. application Ser. No. 10/262,879, filed on Oct. 3, 2002, which is assigned to the assignee of the present invention and is hereby incorporated by reference in its entirety.

As described in the Ser. No. 10/262,879 application, the space 168 between the lowered ceiling 162 and the ceiling of the room 100 may function as a plenum through which heated cooling fluid may be returned to the air conditioning unit 114. According to embodiments of the invention, the base station 124 may be configured to operate the returns 164 and 166 in manners similar to those described hereinabove with respect to the vent tiles 116 and manners described in U.S. application Ser. No. 10/262,879.

FIG. 1D is a cross-sectional side view of an upper portion of the room 100 according to a further embodiment of the invention. According to this embodiment, heat exchanger units ("HEU") 172 and 174 may be provided in the room 100. The HEU's 172 and 174 are disclosed and described in co-pending U.S. application Ser. No. 10/210,040, filed on Aug. 2, 2002, which is assigned to the assignee of the present invention and is hereby incorporated by reference in its entirety. As described in the Ser. No. 10/210,040 application, the HEU's 172 and 174 generally operate to receive heated cooling fluid from the racks 102-108, cool the received air, and deliver the cooled air back to the racks 102-108 in a substantially controlled manner.

According to embodiments of the invention, the base station 124 may be configured to operate the returns 172 and 174 in manners similar to those described hereinabove with respect to the vent tiles 116 and manners described in U.S. application Ser. No. 10/262,879.

Figure 2:
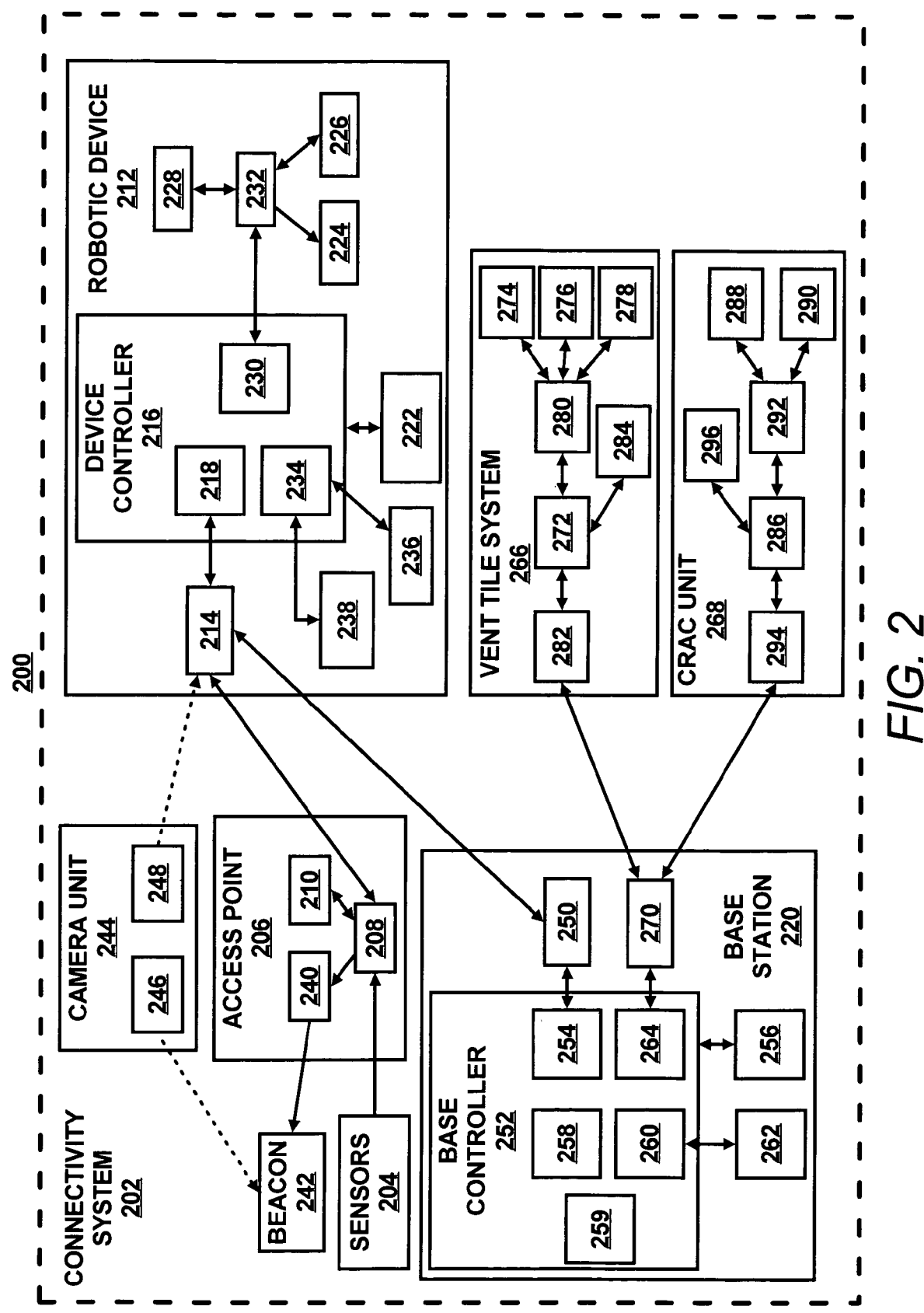
FIG. 2 is an exemplary block diagram of a connectivity system according to an embodiment of the invention.

FIG. 2 is an exemplary block diagram 200 of a connectivity system 202 according to an embodiment of the invention. It should be understood that the following description of the block diagram 200 is but one manner of a variety of different manners in which such a connectivity system 202 may be configured. In addition, it should be understood that the block diagram 200 may include additional components and that some of the components described herein may be removed and/or modified without departing from the scope of the invention. For instance, the block diagram 200 may include a rack inlet control system. The rack inlet airflow control system may include a rack louver system and/or an angled panel. The rack louver system may comprise the rack louver system described in commonly assigned and co-pending U.S. patent application Ser. No. 10/425,621, filed on Apr. 30, 2003, the disclosure of which is hereby incorporated by reference in its entirety. The angled panel may include the angled panel described in commonly assigned and co-pending U.S. patent application Ser. No. 10/425,624, filed on Apr. 30, 2003, the disclosure of which is hereby incorporated by reference in its entirety.

The connectivity system 202 includes sensors 204 for collecting data. The sensors 204 may, for example, collect data pertaining to one or more environmental conditions at various locations of a room, e.g., room 100. As another example, the sensors 204 may be configured to detect the placement of components in racks, e.g., infrared sensors, or sensors configured to communicate with the components in the racks. In any regard, the sensors 204 may be configured to communicate collected data to an access point 206, e.g., access points 120, as described in greater detail hereinabove. In addition, the sensors 204 may comprise radio frequency identification (RFID) tags that are relatively easy to obtain and have a limited wireless range.

Although a single access point 206 has been illustrated in FIG. 2, it should be understood that any number of access points 206 may be included in the connectivity system 202. In addition, as described hereinabove, the access points 206 may be associated with sensors 204 of various zones. For instance, each of the access points 206 may be associated with sensors 204 located in individual racks, rows of racks, etc. In this regard, the access points 206 may be configured to receive data from sensors 204 associated with the respective access points 206.

The access point 206 includes a receiver/transmitter module 208 configured to enable wired and/or wireless transfer of information between the sensors 204 and the access point 206. The receiver/transmitter module 208 generally includes any reasonably suitable components to enable information receipt from the sensors 204. The information received from the sensors 204 may be stored in an access point memory 210. The access point memory 210 may be implemented as a combination of volatile and non-volatile memory, such as DRAM, EEPROM, flash memory, and the like.

The receiver/transmitter module 208 may also enable wired and/or wireless transfer of information to a robotic device 212, e.g., the robotic deice 122. In this regard, the robotic device 212 also includes a receiver/transmitter module 214 configured to receive information from the access point 206. The robotic device 212 also includes a device controller 216 configured to control operations of the robotic device 212. The device controller 216 may comprise a microprocessor, a micro-controller, an application specific integrated circuit (ASIC), and the like. Some of the operations capable of being performed by the device controller 216 are described in greater detail hereinbelow.

The receiver/transmitter module 214 of the robotic device 212 may forward information received from the access point 206 to a data processing module 218 of the device controller 216. The data processing module 218 may make certain determinations based upon the information received from via the receiver/transmitter module 214. For instance, the data processing module 218 may determine whether the robotic device 212 should immediately proceed to a base station 220, e.g., base controller 124, to transfer information received from the access point 206 or to continue along a plotted route. The data processing module 218 may decide to proceed to the base station 220 if the information received from the access point 206 indicates that, for instance, the temperature of a component in the associated area of the access point 206 is above or below a critical level.

The information received from the access point 206 via the receiver/transmitter module 214 may be stored in a device memory 222. The device memory 222 may also be configured to provide storage of a computer software that provides the functionality of the robotic device 212. The device memory 222 may be implemented as a combination of volatile and non-volatile memory, such as DRAM, EEPROM, flash memory, and the like.

The robotic device 212 may comprise the configuration of the robotic device 122 illustrated in FIG. 1A. Thus, the robotic device 212 may include one or more arm actuators 224 for articulating an arm assembly, e.g., the arm 148 of robotic device 122, into various positions. The robotic device 212 may also include a sensor 226 configured to, for instance, detect one or more environmental conditions. The robotic device 212 may also include a camera 228 for obtaining images of various locations in the room. Although not shown, the one or more arm actuators 224 may include actuators for articulating the sensor 226 and/or camera 228 with respect to the arm assembly. In any respect, the arm actuator(s) 224 and the actuators of the sensor 226 and camera 228 may comprise direct current (DC) motors.

The instructions from the device controller 216 may be developed by a data receipt module 230 and may be sent through interface electronics 232. The interface electronics 232 may act as an interface between the device controller 216 and the arm actuator(s) 224, the sensor 220, and the camera. By way of example, the interface electronics 232 may vary the voltage supplied to the arm actuator(s) 224 to thereby articulate the sensor 226 and the camera 228 into various positions.

The sensor 226 may supplement the environmental condition detection of the sensors 204. For instance, because the robotic device 212 is able to move to various locations of the room, the robotic device 212 may detect environmental conditions at locations where, for instance, there may be a gap in the coverage by the sensors 204. The sensor 226 may transmit or otherwise send the obtained information to the device controller 216. The device controller 216 may store this information in the memory 222. For instance, the device memory 222 may store temperature measurements obtained during an environmental condition detection operation along with the locations of the detections. The device memory 222 may store this information in the form of a table, map, etc.

The device controller 216 may also include a maneuvering module 234 configured to control the movements of the robotic device 212. The maneuvering module 234 may instruct a steering/propelling mechanism 236 configured to control the motivation and direction of travel of the robotic device 212. The steering/propelling mechanism 236 may thus comprise actuators configured to vary these aspects of the robotic device 212 travel. In determining manners in which the steering/propelling mechanism 236 are to be operated the maneuvering module 234 employ information received from a guidance sensor 238, e.g., a laser guidance tool, sonar tool, a camera assembly, combinations thereof, and the like, configured to detect the distances of objects located within the field of view of the guidance sensor 238. The received information may, for instance, be in the form of detected positions of objects located around the robotic device 212.

The maneuvering module 234 may process the images received from the guidance sensor 238, e.g., with image recognition software. In this regard, the maneuvering module 234 may determine the objects located within the guidance sensor's 238 field of view, whether the object is an avoidable obstacle, and determine a path around the obstacle if it is avoidable. By way of example, the maneuvering module 234 may operate the steering/propelling mechanism 236 to decrease the speed of the robotic device 212 and alter its course in response to an object being detected in the path of the robotic device 212.

In one respect, the device memory 222 may store data/information pertaining to various operations and sensing algorithms responsive to various inputs. For example, the device memory 222 may store a map of the data center layout and the device controller 216 may access the map to determine a route to follow to arrive at the locations.

According to an embodiment of the invention, the access point 206 may include a signal module 240 configured to control the operations of a beacon 242, e.g., a light, alarm, etc. The signal module 240 may activate the beacon 242 in response to receipt of information received from the sensors 204. In addition, the signal module 240 may activate the beacon 242 if it is determined that information is to be transferred to the robotic device 212. The robotic device 212 may travel to the access point download location, e.g., access point download location 140, associated with the access point 206 that activated its associated beacon 242. The robotic device 212 may then download information from that access point 206.

The activation of a beacon 242 may be detected in a variety of different manners according to embodiments of the invention. According to one embodiment, a camera unit 244, e.g., camera 125, may be implemented to detect activated beacons 242. In this regard, the camera unit 244 may include a receiver module 246 configured to, for instance, image various areas of the room and to detect activated beacons 242. The camera unit 244 may also include a transmitter module 248 configured to transmit information to one or both of the robotic device 212 and the base station 220. The transmitter module 248 may be configured to wirelessly communicate with the robotic device 212 and/or the base station 220. The transmitter module 248 may also be configured to communicate under a wired protocol with the base station 220. In any regard, the detection of activated beacons 242 and transmission of information pertaining to the detection of activated beacons 242 may include transmission of the locations of the activated beacons 242. Through use of the camera unit 244 to detect activated beacons 242, the robotic device 212 may become aware of instances where it is to obtain information from the various access points 206. The camera unit 244 may therefore be particularly useful in substantially large rooms as the robotic device 212 may be unable to image relatively large areas of the room at any given time.

The transmitter 248 of the camera unit 244 may be capable of emitting a relatively strong signal configured to travel relatively large distances. In this regard, in a substantially large room, for instance, a camera unit 244 located at a relatively large distance from the robotic device 212 may still be able to transmit the detected information to the robotic device 212. In addition, the robotic device 212 may receive information from the camera unit 242 through the receiver/transmitter unit 214. Issues relating to security are generally not pertinent because the information transmitted from the camera unit 244 to the robotic device 212 generally comprises information pertaining to activated beacons 242 and their locations.

According to another embodiment, activated beacons 242 may be detected directly by the robotic device 212. In this regard, for instance, if the beacon 242 is a light signal, the robotic device 212 may detect the activated beacons 242 by imaging those beacons 242 with the camera 228. Alternatively, if the beacon 242 emits an audible signal, the robotic device 242 may comprise include an auditory device (not shown) configured to detect the audible signal. In any regard, if the robotic device 212 detects that a beacon 242 has been activated, the robotic device 212 may travel to the location of the access point 206 that activated its associated beacon 242 and may receive information from that access point 206.

The robotic device 212 may store the information received from the access point 206 in the device memory 222. In addition, the robotic device 212 is configured to travel to a base station download location, e.g., base station download location 142, at various times. Some of manners in which the robotic device 212 may be operated to determine the times when the robotic device 212 is to travel to the base station download location are described hereinbelow. At the base station download location, the robotic device 212 is configured to transmit the stored information received from the access point 206 to the base station 220. More particularly, the robotic device 212 may transmit the information through the receiver/transmitter module 214 and the base station 220 may receive the information through a receiver/transmitter module 250. The received information may be transmitted or otherwise sent to a base controller 252.

The base controller 252 is configured to control operations of the base station 220. The base controller 252 may comprise a microprocessor, a micro-controller, an application specific integrated circuit (ASIC), and the like. Some of the operations capable of being performed by the base controller 252 are described in greater detail hereinbelow.

As illustrated in FIG. 2, a base data processing module 254 may receive the information from the receiver/transmitter module 250. The base data processing module 254 may process the received information to determine, for instance, what, if any, actions are to be taken. By way of example, the received information may be stored in a base memory 256. The base memory 256 may also be configured to provide storage of a computer software that provides the functionality of the base station 220. The base memory 256 may be implemented as a combination of volatile and non-volatile memory, such as DRAM, EEPROM, flash memory, and the like. As another example, if the information pertains to an inventory of the components housed in the room, an inventory tracking module 258 may receive the information and update a database containing the inventory stored in the base memory 256.

The base controller 252 may also include various other modules, indicated as module 259 in FIG. 2, configured to perform various other functions. For instance, the module 259 may be configured to process information pertaining to the status of various LED lights on components housed in the room.

The base data processing module 254 may also devise various routes for the robotic device 212. By way of example, the base data processing module 254 may determine that the robotic device 212 has not obtained information from certain access points 206 and that such information may be necessary to update either its inventory of components or cooling fluid provisioning in the room. In this example, the base data processing module 254 may devise a route to generally cause the robotic device 212 to travel to the various access point download locations associated with those access points 206. As another example, the base data processing module 254 may devise a route for the robotic device 212 that will enable the robotic device 212 to obtain a maximum coverage of the room within a minimum amount of time, e.g., through use of a Manhattan algorithm.

The base controller 252 may also include a recharging module 260 configured to control the charging of a robotic device 212 power supply (not shown), e.g., rechargeable battery. The recharging module 260 may operate a recharging station 262 configured to recharge the power supply of the robotic device 212. In one respect, the recharging station 262 may comprise a recharging pad and the robotic device 212 power supply may include conductive elements configured to contact the recharging pad and thereby recharge itself. In another respect, the recharging station 262 may include any other reasonably suitable device configured to enable electrical charge conduction to the robotic device 212 power supply.

The base controller 252 may also include a cooling system control module 264 configured to control the operations of one or more cooling system components. The cooling system components are illustrated in FIG. 2 as including a vent tile system 266 and a CRAC unit 268 for purposes of simplicity and not of limitation. However, the cooling system components may also include a louver system and/or an angled panel system as described in co-pending U.S. patent applications Ser. Nos. 10/425,621 and 10/425,624, respectively. As described in those applications, cooling fluid flow through individual racks may substantially be controlled through manipulation of either the louver system or angled panel system. In addition, the cooling system components may include those components illustrated in FIGS. 1C and 1D, and as described hereinabove.

The cooling system control module 264 may determine how the cooling system components may be manipulated in response to environmental condition information received from the robotic device 212. In one respect, the cooling system control module 264 may access environmental condition information stored in the base memory 256 to make determinations on how to manipulate one or more of the cooling system components. The environmental condition information stored in the base memory 256 may comprise information pertaining to the locations of the detected environmental condition information along with the times at which the environmental condition information was obtained. The cooling system control module 264 may store this information and track changes in environmental condition information as a function of time. In this regard, the cooling system control module 264 may make determinations on how to manipulate the cooling system components according to changes in the environmental conditions at various locations of the room. The cooling system control module 264 may communicate instructions to the cooling system components through, for example, a network adaptor 270. The network adaptor 270 may be configured to communicate with the cooling system components under the wired or wireless protocols described hereinabove.

As shown in FIG. 2, the vent tile system 266 includes a vent controller 272 and plurality of vents 274-278. Although three vents 274-278 are illustrated in FIG. 2, it should be understood that any number of vents may be included in the vent tile system 266. In addition, although one vent controller 272 is illustrated, any number of vent controllers may be implemented to control any number of vents without departing from the scope of the invention. Therefore, the depiction of one vent controller 272 and three vents 274-278 is for purposes of illustration only and are not meant to limit the invention in any respect.

The vent controller 272 is generally configured to manipulate the vents 274-278 to vary cooling fluid flow characteristics, e.g., volume flow rate, direction, etc., through the vents 274-278. In addition, the vent controller 272 may comprise a microprocessor, a micro-controller, an application specific integrated circuit (ASIC), and the like. Instructions from the vent controller 272 may be transmitted to the vents 274-278 through interface electronics 280. The interface electronics 280 may be provided to act as an interface between the vent controller 272 and the vents 274-278. By way of example, the interface electronics 280 may include a wired or wireless platform to enable the communication of instructions from the vent controller 272 to the vents 274-278. In addition, the interface electronics 280 may operate one or more actuators configured to vary the cooling fluid flow characteristics through the vents 274-278.

Instructions from the cooling system control module 264 may be received through a network adaptor or interface 282. The vent controller 272 may process the instructions and may operate one or more of the vents 274-278 in response to the processed instructions. By way of example, the vent controller 272 may determine which of the vents 274-278 to manipulate and the manners in which the vents 274-278 are to be manipulated in response to an instruction from the cooling system control module 264 to, for instance, decrease the temperature of a particular area of the room. In this regard, the vent controller 272 may store the locations of the vents 274-278 as well as algorithms for their operations in a vent memory 284. The vent controller 272 may access this information in response to receipt of instructions from the cooling system control module 264.

The CRAC unit 268 is illustrated as including a CRAC controller 286, a compressor 288 and a fan 290. The CRAC unit 268 may comprise components other than the compressor 288. For instance, the CRAC unit 268 may comprise a three-way valve or other mechanism for fluid metering. Thus, it should be understood that the references directed to the compressor 288 are for illustrative and simplicity of description purposes and thus are not meant to limit the invention to the use of the compressor 288. The CRAC controller 268 is generally configured to control the operations of the compressor 288 and the fan 290. In addition, the CRAC controller 286 may comprise a microprocessor, a micro-controller, an application specific integrated circuit (ASIC), and the like. The compressor 288 may be operated to vary the temperature of the cooling fluid flowing through the CRAC unit 268. In addition, the fan 290 may be operated to vary the volume flow rate of the cooling fluid delivered from the CRAC unit 268. Instructions from the CRAC controller 286 may be transmitted to the compressor 288 and the fan 290 through interface electronics 292, which may act as an interface between the CRAC controller 286 and the compressor 288 and fan 290. By way of example, the interface electronics 292 may include a platform to enable communication of the instructions. In addition, for instance, the interface electronics 292 may operate to vary the supply of voltage to the compressor 288 and the fan 290 to thereby vary their operations.

Instructions from the cooling system control module 264 may be received through a network adaptor or interface 294. The CRAC controller 286 may process the instructions and may operate one or both of the compressor 288 and the fan 290 in response to the processed instructions. By way of example, the CRAC controller 286 may determine which of the compressor 280 and the fan 290 to manipulate and the manners in which they are to be manipulated in response to an instruction from the cooling system control module 264 to, for instance, decrease certain cooling fluid characteristics, e.g., cooling fluid temperature, volume, etc., delivered to a particular area of the room. In this regard, the CRAC controller 286 may store the affected areas of the CRAC unit 268 as well as algorithms for operating the compressor 288 and the fan 290 in a CRAC memory 296. The CRAC controller 286 may access this information in response to receipt of instructions from the cooling system control module 264.

According to an embodiment of the invention, the connectivity system 202 may be operated in the following manner. The sensors 204 of a particular zone may transmit or otherwise send detected information to the associated access point 206 of that particular zone. The access point 206 may process the detected information and may activate a beacon 242 to alert the robotic device 212 that it contains information to be transmitted to the base station 220. The activation of the beacon 242 may be detected either by a camera unit 244 or the robotic device 212. If the beacon 242 activation is detected by the camera unit 244, the camera unit 244 may transmit a signal to the robotic device 212 generally indicating the location of the activated beacon 242. The robotic device 212 may then travel to the access point download location associated with the access point 206 that activated the beacon 242. The robotic device 212 may then receive information from the access point 206.

The robotic device 212 may store information in the device memory 222 and may travel to a base station download location associated with the base station 220 assigned to the location of the access point 206. The robotic device 212 may then transmit the information received from the access point 206 to the base station 220. The base station 220 may process the received information and make a determination as to whether any further action is to be taken. For instance, if the information pertains to an update of the inventory of the components contained in the room, the base station 220 may update the inventory based upon the information received. As another example, if the information pertains to environmental conditions in the areas associated with the access point 206, the base station 220 may determine manners in which one or more cooling system components may be manipulated in response to the detected environmental conditions.

Although a single robotic device 212 is illustrated in FIG. 2 as receiving information from the access point 206 and delivering the received information to the base station 220, it should be understood that a plurality of robotic devices 212 may operate in this manner without departing from the scope of the invention. If a plurality of robotic devices 212 is employed, they may be configured to traverse different sections of the room to thereby increase the level of connectivity between the various access points 206 and the base station 220. In one respect, the robotic devices 212 may provide redundancy in providing the connectivity between the access point 206 and the base station 220.

In another respect, the robotic devices 212 may afford increased efficiency in response times as compared with the use of a single robotic device 212. For instance, the robotic devices 212 may be deployed in zones having different thermal characteristics, e.g., various areas of the room that are known to be difficult to maintain within predetermined temperature ranges, etc. As another example, the robotic devices 212 may be deployed according to various time schedules, e.g., one or more robotic devices 212 may be deployed while the batteries of other robotic devices 212 are being charged, etc. In addition, the robotic devices 212 may deployed according to different levels of operation in the room. For instance, the different levels of operation may pertain to various stages of critical operation. In this regard, various robotic devices 212 may be deployed according to the level of critical operation in the room, e.g., the number of robotic devices 212 deployed may increase with increased levels of critical operation and the number of robotic devices 212 deployed may decrease with decreased levels of critical operation.

In yet another respect, the robotic devices 212 may be configured to perform various different operations. For instance, the robotic devices 212 may be configured with different capabilities for monitoring and/or controlling hardware and operating strategy. In this regard, the variously configured robotic devices 212 may be deployed according to various schemes depending, for instance, upon time schedules and areas where they may be useful in augmenting data collection according to their respective configurations.

Figure 3A:
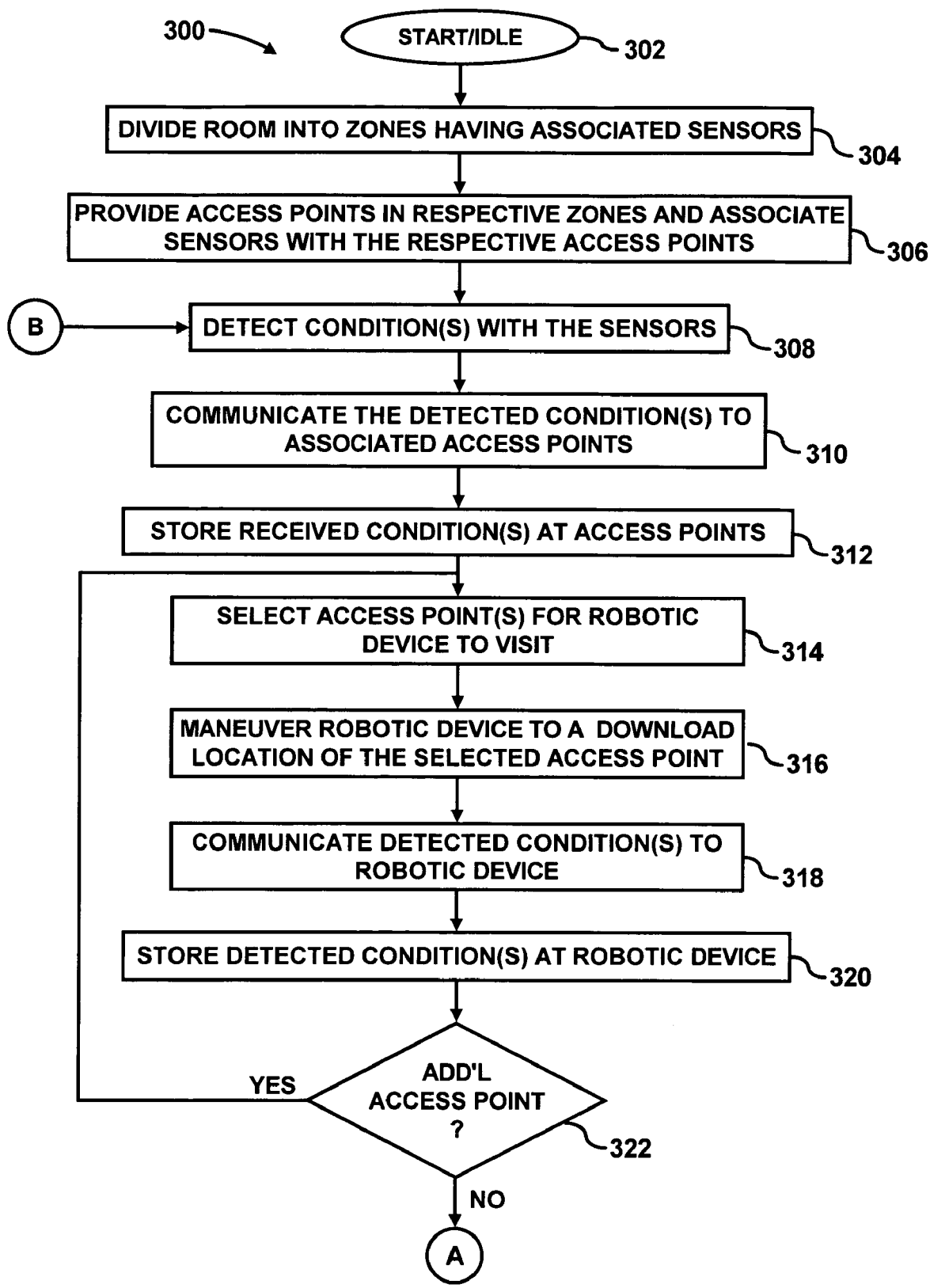
FIGS. 3A and 3B, collectively, illustrate an exemplary flow diagram of an operational mode of a method for data connectivity in a room with a robotic device according to an embodiment of the invention.
Figure 3B:
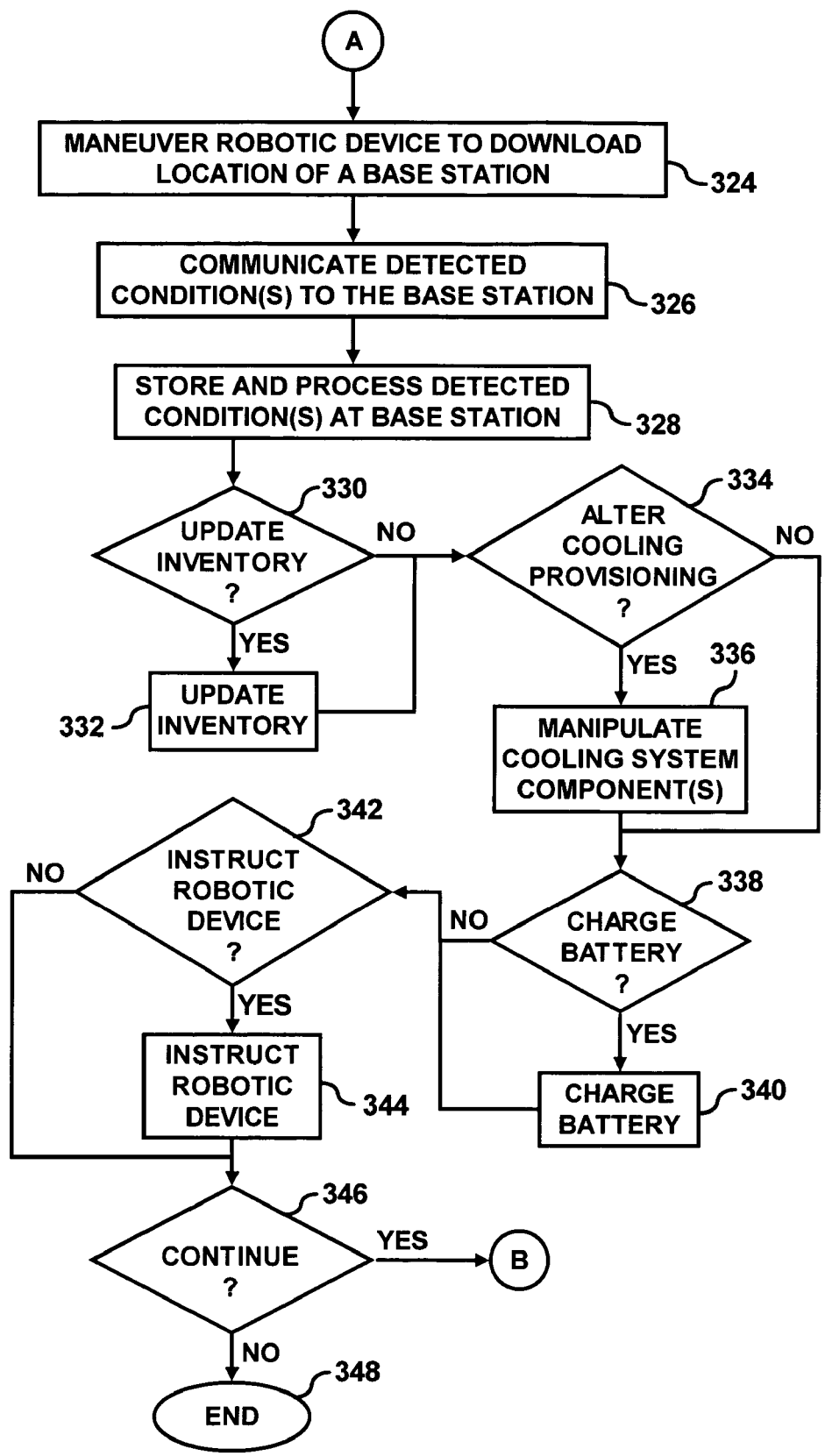

FIGS. 3A and 3B, collectively, illustrate an exemplary flow diagram of an operational mode 300 of a method for data connectivity in a room with a robotic device according to an embodiment of the invention. It is to be understood that the following description of the operational mode 300 is but one manner of a variety of different manners in which an embodiment of the invention may be practiced. It should also be apparent to those of ordinary skill in the art that the operational mode 300 represents a generalized illustration and that other steps may be added or existing steps may be removed, modified or rearranged without departing from the scope of the invention.

The description of the operational mode 300 is made with reference to the block diagram 200 illustrated in FIG. 2, and thus makes reference to the elements cited therein. It should, however, be understood that the operational mode 300 is not limited to the elements set forth in the block diagram 200. Instead, it should be understood that the operational mode 300 may be practiced by a connectivity system having a different configuration than that set forth in the block diagram 200.

In addition, the operational mode 300 may be executed substantially concurrently with a plurality of robotic devices 212, access points 206, base stations 220, etc. Thus, for instance, one or more of the robotic devices 212 may perform some of the steps described in the operational mode 300 while others of the robotic devices 212 are performing other steps in the operational mode 300. In one respect, data may be conveyed from the access points 206 to the base stations 220 in a relatively efficient manner.

The operational mode 300 may be initiated in response to a variety of stimuli at step 302. For example, the operational mode 300 may be initiated in response to a predetermined lapse of time, in response to receipt of a transmitted signal, manually initiated, etc. At step 304, the room, e.g., room 100, may be divided into zones in the zones may comprise associated sensors, e.g. sensors 204. As described hereinabove, the zones may be selected based upon, for example, the delivery of cooling provisions, the layout of the room, etc. In addition, the zones may include a single rack, multiple racks, or portions of individual or multiple racks. At step 306, access points, e.g., access point 206, may be provided in their respective zones and the access points may be associated with the sensors 204 associated with the particular zones.

At step 308, the sensors 204 may detect at least one condition. As also described hereinabove the sensors 204 may be configured to detect one or more environmental conditions, e.g., temperature, humidity, pressure, air flow velocity and direction, etc. In addition or alternatively, the sensors 204 may detect the placement or removal of components, for instance, the components 118 housed in the racks 102-108 contained in the room 100. The at least one condition detected by the sensors 204 may be communicated to their respective associated access points 206 at step 310. The sensors 204 may wirelessly communicate the detected at least one condition to the access point 206 to which they are associated and the wireless communication may be configured to transmit over a relatively short distance, e.g., within approximately 1-4 feet.

The access points 206 may store the information pertaining to the at least one condition detected by the sensors 204 in a memory, e.g., memory 210, at step 312. The information may include the locations and/or the identifications of the sensors 204 from which the detected at least one condition was received. In this regard, the access points 206 may have stored in its memory 210 the locations of the sensors 204 that are associated with the respective access points 206. In addition, or alternatively, the sensors 204 may be assigned unique identifications such that the access points 206 may store in its memory the identifications and locations of the sensors 204.

At step 314, one or more of the access points 206 may be selected for the robotic device, e.g., robotic device 212 to visit and receive information. The one or more access points 206 to be visited by the robotic device 212 may be determined according to a plurality of manners. In one embodiment, the one or more access points 206 may activate an associated beacon, e.g., beacon 242, in response to receipt of at least one condition from the associated sensors 204. In addition, the one or more access points 206 may activate an associated beacon 242 in response to a determination of the at least one condition exceeding a predetermined value. For instance, if the at least one condition comprises temperature, the one more access points 206 may activate an associated beacon 242 in response to the received temperature exceeding a predetermined temperature range. As another example, and the at least one condition comprises the placement or removal of components, the one or more access points 206 may activate an associated beacon 242 in response to the number of components being placed or removed exceeding a predetermined number. In this regard, the one or more access points 206 may not activate their associated beacons 242 unless the received at least one condition warrants transmission of the information received from the sensors 204 to the base station, e.g., base station 220.

In another embodiment, the robotic device 212 may visit one or more access points 206 according to a route devised by either the robotic device 212 or the base station 220. In any respect, the route may be devised according to a routing algorithm that may devise the route before the robotic device 212 visits a first access point 206 or after the robotic device 212 has visited one or more access points 206. As an example, the routing algorithm may devise a route configured to enable the robotic device 212 to visit the associated download locations of the one or more access points within a minimal amount of time. A suitable routing algorithm may comprise a Manhattan algorithm.

As another example, the routing algorithm may categorize the one or more access points 206 into a plurality of groups. The groups for the one or more access points may be selected according to historical data pertaining to the areas associated with the one or more access points 206. For instance, in a two category grouping, the routing algorithm may assign those of the one or more access points 206 having associated areas where it has been historically difficult to maintain one or more environmental conditions within predetermined ranges in a first group. The others of the one or more access points 206 may be assigned to a second group. As another example, the first group may include those of the one or more access points having associated areas where a relatively large number of components have been added, replaced or removed. The second group in this example may include those of the one or more access points having associated areas where the components have not changed to a large extent.

In this regard, the routing algorithm may, for example, devise a route that enables the robotic device 212 to visit those access points 206 (e.g., goal points) in the first group first or more frequently than those access points in the second group. A more detailed description of manners in which various areas of a room may be categorized into a plurality of groups is described in greater detail in co-pending and commonly assigned U.S. patent application Ser. No. 10/639,428, filed on Aug. 13, 2003, the disclosure of which is hereby incorporated by reference in its entirety.

According to another example, the routing algorithm may employ various factors related to, for instance, the number of robotic devices 212 deployed in the room, CRAC unit 268 operabilities, etc. In this example, the routing algorithm may devise routes for a plurality of robotic devices 212 in accordance with one or more of the examples cited hereinabove. In addition, the routing algorithm may devise routes according to timing schedules for individual robotic devices 212. The timing schedules may substantially be dependent upon the velocities at which the robotic devices 212 are capable of traveling as well as the configurations of the robotic devices 212, e.g., the types of sensors, manipulators, etc., carried by the robotic devices 212. By way of example, the timing schedules may be set such that the robotic devices 212 receive information from various ones of the access points 206 in order to substantially prevent problems related to insufficient or excess cooling fluid supply being delivered to the areas associated with the access points 206.

The timing schedules may, moreover, be substantially based upon response times for various CRAC units 268 deployed in the room. The response times of the various CRAC units 268 may vary for different locations of the room, e.g., locations that are farther away from the CRAC units 268 may require a greater amount of time for changes in cooling provisions to take effect. In this regard, the routes devised by the routing algorithm may substantially be based upon these considerations. Thus, for instance, the routing algorithm may devise routes configured to enable the robotic devices 212 to visit those access points 206 associated with areas that have slower response times more frequently than other access points 206.

According to a further example, the routing algorithm may devise routes and timing schedules substantially based upon availability and efficiency studies of the cooling system components and the components housed in the room. The availability of the components may pertain to, for instance, the reliability of the components, e.g., servers, as well as their capabilities. For instance, the functions of some of the components may be transferred to other components, e.g., their workloads may substantially be consolidated to areas associated with a smaller number of access points 206, such that the robotic devices 212 may only have to visit the smaller number of access points 206. In addition, the availability of the cooling system components, e.g., the CRAC units 268, may pertain to, for instance, the capacity and/or output volume capabilities of the CRAC units 268. Thus, for instance, the CRAC units 268 having relatively high capacities or output capabilities, may be considered as having greater availability as compared with other CRAC units 268. Because these CRAC units 268 have greater availability, the routing algorithm may devise routes and timing schemes for the robotic devices 212 that generally cause the robotic devices 212 to visit access points 206 associated with these CRAC units 268 less frequently as compared with other access points 206.

According to yet a further example, the routing algorithm may devise routes and timing schedules substantially based on the reliabilities of the components and/or service level agreements. More particularly, for instance, the routes and/or timing schedules may be devised such that the robotic devices 212 are configured to visit more frequently those access points 206 associated with areas having components that are relatively less reliable. In addition, or alternatively, the routes and/or timing schedules may be devised according to service level agreements. By way of example, the agreements may include the level of monitoring to be performed by the robotic devices 212 and the routing algorithm may devise routes and/or timing schedules according to the level of monitoring in the agreements.

According to another embodiment, a conventional computational fluid dynamics tool, e.g., FLOVENT, may be implemented to create a numerical model of one or more environmental conditions at various locations of the room 100. The routing algorithm may employ the numerical model created by the computational fluid dynamics tool in devising a route for the robotic device 212 to follow. For instance, the numerical model may indicate that certain sections of the room 100 require a greater level of attention than other sections of the room, e.g., those sections of the room having temperatures that exceed a predetermined temperature range. In this regard, the routing algorithm may devise a route for the robotic device 212 that will enable the robotic device 212 to visit access points located in those sections of the room that require the greater level of attention. The robotic device 212, for instance, may therefore minimize the amount of time required for it to obtain information from access points 206 having relatively important information.

According to a further embodiment of the invention, a combination of the algorithms described hereinabove may be employed to select the one or more access points 206 for the robotic device to 12 to visit. For instance, a routing algorithm may be employed to devise a route for the robotic device to 12 to follow in visiting the access points 206. During the travel of the robotic device to 12 along the devised route, an activated beacon 242 may be detected and the robotic device 212 may be directed to visit the access point 206 that activated the beacon 242, thereby causing the robotic device 212 to alter its path from the devised route. After the robotic device 212 has visited the access point 206 that activated the beacon 242 and received information from that access point 206, the robotic device 212 may return to the base station 220 to communicate the received information to the base station 220. Alternatively, the robotic device 212 may return to the devised route after it has received information from that access point 206. The determination of whether to return to the devised route or to the base station 220 may be based upon the information received from that access point 206. For instance, if it is determined that a relatively immediate action is required based upon the information, the robotic device 212 may return directly to the base station 220. This may occur, for instance, if the received information indicates that a temperature in an associated area of that access point 206 is beyond or reaching a critical level. Otherwise, the robotic device 212 may return to the devised route.

Once an access point 206 for the robotic device 212 to visit has been selected, the robotic device 212 may be maneuvered to visit the selected access point 206 at step 316. More particularly, for instance, the robotic device 212 may be maneuvered to travel to a download location, e.g., an access point download location 140, of the selected access point 206. When the robotic device 212 is within a vicinity, e.g., within approximately 1-4 feet, of the selected access point 206 or when the robotic device 212 arrives at the download location, the selected access point 206 may communicate the detected at least one condition to the robotic device 212 at step 318. At step 320, the robotic device 212 may store the received at least one condition information from the access point in its memory, e.g., device memory 222.

At step 322, the robotic device 212 may determine whether additional access points 206 are to be visited. This determination may be based upon various factors depending upon the robotic device's 212 operational mode. For instance, if the robotic device 212 is programmed to visit an access point 206 in response to the activation of a beacon 242, an additional access point 206 may be selected if another beacon 242 is activated. As another example, if the robotic device 212 is in the process of following a devised route, an additional access point 206 may be selected if the devised route indicates that the robotic device 212 is to receive information from an additional access point 206. In any regard, if it is determined that the robotic device to 12 is to receive information from an additional access point 206, steps 314-422 may be repeated.

If it is determined that the robotic device 212 has no other access points 206 from which to receive information, the robotic device 212 may be maneuvered to a location in the vicinity, e.g., within approximately 1-4 feet of the base station 220 at step 324. More particularly, for instance, the robotic device 212 may be maneuvered to a download location, e.g., a base station download location 142, near the base station 220. When the robotic device 212 is in the vicinity of the base station 220 or when the robotic device 212 arrives at the download location, the robotic device 212 may communicate the information received from the one or more access points 206 to the base station 220 at step 326. The base station 220 may store the received information and may also process the information at step 328. In terms of processing the information, the base station 220, and more particularly, the base controller, e.g., base controller 252, may employ the information in a variety of respects.

As indicated at step 330, the base controller 252 may determine whether an inventory of components, e.g., the components 118 housed in racks 102-108 contained in the room 100, is to be updated. The decision to update the inventory of components may be based upon the information received from the robotic device 212. For instance, if the information contains an indication that certain components have been removed, added, or moved, the base controller 252 may update the inventory to reflect these changes at step 332. Step 332 may comprise the creation of an inventory of components if an inventory of the components was not previously created. If there have been no changes in the inventory of the components, or after the inventory has been updated or created at step 332, the base controller 252 may determine whether the cooling provisioning should be altered at step 334.

The determination of whether to alter the cooling provisioning may substantially be based upon the information received from the robotic device 212. For instance, the base controller 252 may determine that a particular area of the room 100 should receive greater amounts of cooling fluid in response to the information indicating that the temperatures in that particular area are above a predetermined maximum temperature. As another example, the base controller 252 may determine that a particular area of the room 100 should receive lesser amounts of cooling fluid in response to the information indicating that the temperatures in that particular area are below a predetermined minimum temperature.

If the base controller 252 determines that cooling provisioning requires alteration, at step 336, the base controller 252 may control one or more cooling system components in manners described hereinbelow.

According to an embodiment of the invention, the base controller 252 may control the cooling system components, e.g., vent tiles 274-274, CRAC unit 268, etc., in manners similar to those described in U.S. Pat. No. 6,574,104. For example, as described with respect to FIGS. 3A and 3B of that document, components of the cooling system may be manipulated to afford zonal and global temperature control within the data center. In addition, cooling system operations may be based upon detected temperatures and/or pressures at various locations within the data center. In like manners, the components of the cooling system of the present invention may be manipulated to provide local and zonal temperature variations according to the principles set forth in U.S. Pat. No. 6,574,104. Moreover, the base controller 252 may operate the cooling system components to vary the cooling fluid provisioning to those areas associated with the access points that communicated information to the robotic device indicating that cooling fluid provisioning required manipulation.

According to additional embodiments of the invention, the base controller 252 may operate the cooling system components, e.g., HEU's 172, 174, CRAC unit 268, etc., in manners similar to those manners described in co-pending U.S. patent application Ser. No. 10/210,040. As described in that application, HEU's may be provided to enable generally localized receipt of air and delivery of cooling fluid to the racks of a data center. The control of the cooling fluid delivery and intake of air may be based according to detected temperatures in the vicinities of the racks.

According to a further embodiment of the invention, the base controller 252 may operate the cooling system components, e.g., returns 164, 166, CRAC unit 268, etc., in manners similar to those manners described in co-pending U.S. patent application Ser. No. 10/262,879. As described in that application with respect to FIGS. 3A and 3B, components of a cooling system may be manipulated to vary cooling fluid characteristics, e.g., temperature, pressure, volume, etc., in a data center. In addition, a return configured to vary the flow and direction of air intake from the room may be used to control air removal from the room.

According to yet further embodiments of the invention, the base controller 252 may operate the cooling system components, e.g., vent tiles 274-278, CRAC unit 268, etc., in manners similar to those manners described in co-pending U.S. patent application Ser. No. 10/303,761. As set forth in that application, the plenum of a data center may be divided into various zones by controllable partitions. The pressure within the zones may be varied by operation of the controllable partitions and the controllable partitions may be manipulated in response to detected changes in temperature and/or pressure either in the data center or in the zones of the plenum. The room of the present invention may be provided with the partitions described in U.S. patent application Ser. No. 10/303,761 and may operate in similar manners to those set forth in that application. In this regard, the cooling system components of the present invention may be operated in manners similar to those set forth in U.S. patent application Ser. No. 10/303,761.

According to yet further embodiments of the invention, the base controller 252 may operate the cooling system components, e.g., vent tiles 274-278, CRAC unit 268, etc., in manners similar to those manners described in co-pending U.S. patent application Ser. No. 10/351,427. As described in that application, air flow through vents of a cooling system may be varied according to detected pressures in the plenum of a data center. The room of the present invention may include similarly configured vents and pressure sensors. In this regard, the base controller 252 may operate the cooling system components of the present invention in manners similar to those described in U.S. patent application Ser. No. 10/351,427.

At step 338, it may be determined whether a battery of the robotic device 212 is to be charged. The determination of whether to charge a battery of the robotic device 212 may be based upon, for instance, the elapsed time from the previous charge, the current level of charge, the level of charge required to complete a devised route, etc. If it is determined that a battery of the robotic device 212 is to be charged, the battery may be charged at step 340.

At step 342, the base controller 252 may determine whether the robotic device 212 is to receive further instructions, e.g., a new route for the robotic device 212 to follow. If the base controller 252 determines that the robotic device 212 is to receive instructions, the base controller 252 may communicate these instructions to the robotic device 212 at step 344. At step 346, it may be determined whether the operational mode 300 is to be continued. The operational mode 300 may be continued if, for example, the robotic device 212 receives instructions to obtain information from one or more of the access points 206. In addition, if the operational mode 300 is to be continued, steps 308-346 may be repeated. The operational mode 300 may be repeated for an indefinite period of time, e.g., so long as the components in the room are operational, for a predetermined period of time, between predetermined time periods, etc. Moreover, steps 304 and 306 may also be repeated if, for instance, the room 100 is divided into additional zones and/or if access points 206 are added or removed.

If it is determined that the operational mode 300 is to be discontinued, e.g., a time period expires, the components in the room are powered down, the operational mode 300 is manually discontinued, etc., the operational mode 300 may end as indicated at step 348. Step 348 may be similar to an idle mode for the operational mode 300 since the operational mode 300 may be reactivated, for instance, when the components of the room become activated, after a predetermined period of time, in response to manual input to reactivate the operational mode 300, etc.

The operations set forth in the operational mode 300 may be contained as a utility, program, or subprogram, in any desired computer accessible medium. In addition, the operational mode 300 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 4:
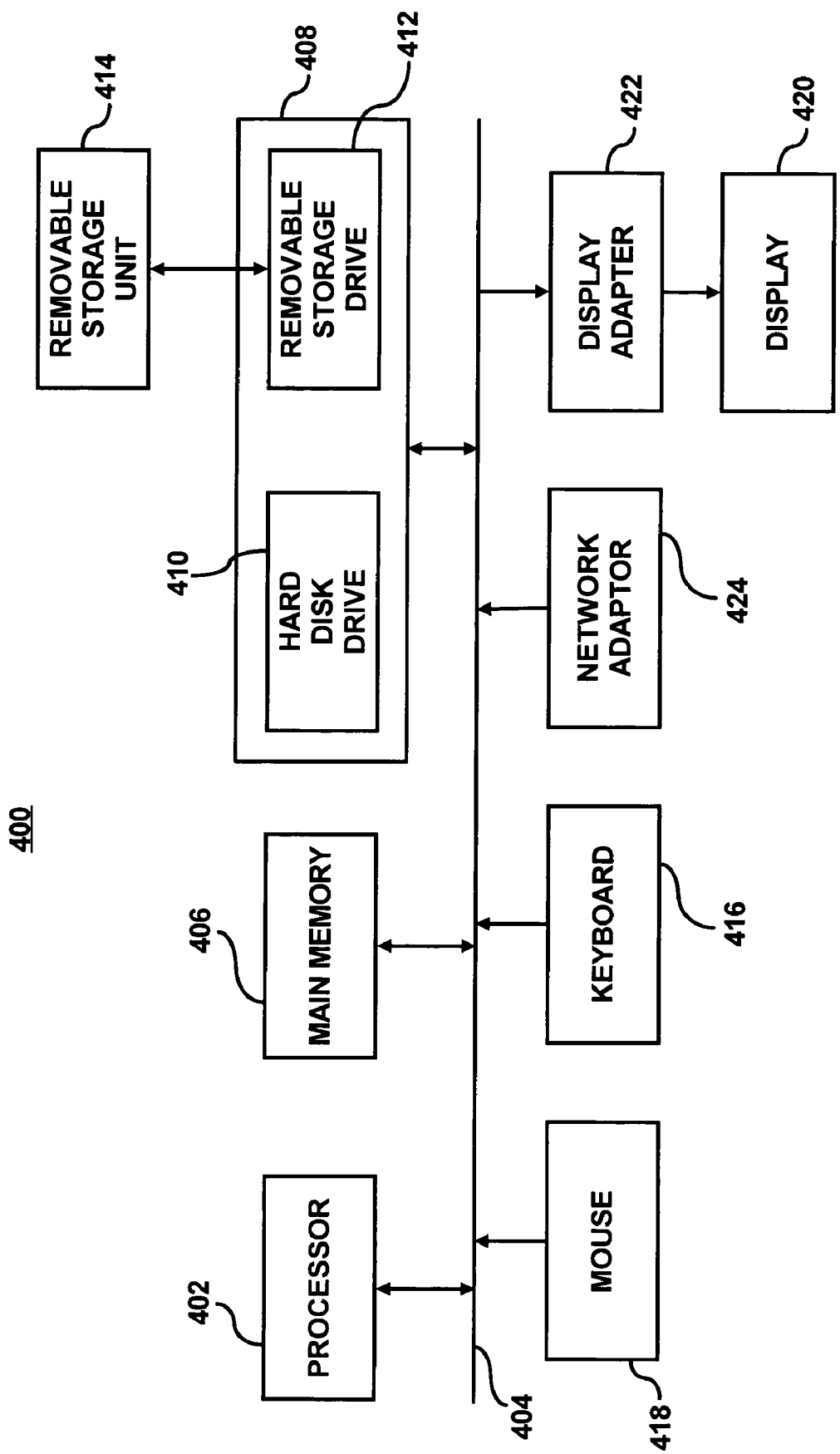
FIG. 4 illustrates an exemplary computer system, according to an embodiment of the invention.

FIG. 4 illustrates an exemplary computer system 400, according to an embodiment of the invention. The computer system 400 may include, for example, the device controller 216, base controller 252, vent controller 272, and/or the CRAC controller 286. In this respect, the computer system 400 may be used as a platform for executing one or more of the functions described hereinabove with respect to the various components of the connectivity system 202.

The computer system 400 includes one or more controllers, such as a processor 402. The processor 402 may be used to execute some or all of the steps described in the operational mode 300. Commands and data from the processor 402 are communicated over a communication bus 404. The computer system 400 also includes a main memory 406, such as a random access memory (RAM), where the program code for, e.g., the base controller 252, the device controller 216, etc., may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the provisioning system may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor 402 may communicate over a network, e.g., the Internet, LAN, etc., through a network adaptor 424.

It will be apparent to one of ordinary skill in the art that other known electronic components may be added or substituted in the computer system 400. In addition, the computer system 400 may include a system board or blade used in a rack in a data center, a conventional "white box" server or computing device, etc. Also, one or more of the components in FIG. 4 may be optional (e.g., user input devices, secondary memory, etc.).

By virtue of certain embodiments of the invention, a robotic device enables connectivity of various components in a room, e.g., a data center. More particularly, a robotic device operates as a means of conveying information from various locations of the room to other locations of the room. In this regard, the robotic device is designed to generally enable secure and effective communication of information between the various components in the room. Therefore, for instance, data need not be transmitted across relatively large distances for the information to be received by, for instance, a base station configured to control operations of various components in the room.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for data connectivity in a room with a robotic device, said method comprising:
    detecting at least one condition with a plurality of sensors;
    communicating the detected at least one condition from the sensors to associated access points;
    selecting one or more access points;
    maneuvering the robotic device to a location in a vicinity of one or more of the selected access points;
    communicating the detected at least one condition from one or more of the selected access points to the robotic device;
    maneuvering the robotic device to a location in a vicinity of a base station; and
    communicating the detected at least one condition from the robotic device to the base station.

2. The method according to claim 1, further comprising:
    dividing a room into zones containing sensors; and
    associating the access points with the sensors of the particular zones.

3. The method according to claim 1, further comprising:
    activating a beacon in response to receipt of die detected at least one condition from the sensors;
    detecting the activated beacon; and
    wherein the step of selecting one or more access points comprises selecting the access point associated with the activated beacon.

4. The method according to claim 3, wherein the step of detecting the activated beacon comprises detecting the activated beacon with a camera mounted in the room, said method further comprising:
    communicating a location of the activated beacon to the robotic device.

5. The method according to claim 3, wherein the robotic device comprises a camera and wherein the step of detecting the activated beacon comprises detecting the activated beacon with the camera of the robotic device.

6. The method according to claim 1, wherein the step of selecting one or more access points comprises selecting a plurality of access points, said method further comprising:
    maneuvering the robotic device to the vicinities of selected ones of the plurality of access points; and
    communicating the detected at least one condition from the plurality of access points to the robotic device prior to the step of maneuvering the robotic device to a location in a vicinity of the base station.

7. The method according to claim 6, wherein the vicinities of the plurality of access points comprise download locations, said method further comprising:
    devising a route for the robotic device to follow in visiting the download locations of the selected ones of the plurality of access points.

8. The method according to claim 7, wherein the step of devising a route for the robotic device comprises devising a route for the robotic device at the base station, said method further comprising:
    communicating the devised route for the robotic device from the base station to the robotic device.

9. The method according to claim 7, wherein the step of devising a route for the robotic device comprises devising at least one of a route and a timing scheme based upon a routing algorithm.

10. The method according to claim 9, wherein the step of devising a route based upon a routing algorithm comprises devising a route based upon a routing algorithm that enables the robotic device to visit the download locations of the plurality of access points within a minimal amount of time.

11. The method according to claim 9, further comprising:
    categorizing the plurality of access points into a plurality of groups; and
    wherein the step of devising a route based upon a routing algorithm comprises devising a route based upon the categorization of the plurality of access points.

12. The method according to claim 11, wherein the step of categorizing the plurality of access points into a plurality of groups comprises categorizing the plurality of access points according to historical data pertaining to the at least one condition in associated areas of the plurality of access points.

13. The method according to claim 9, further comprising:
    deploying a plurality of robotic devices and a plurality of CRAC units; and
    wherein the step of devising at least one of a route and a timing scheme based upon a routing algorithm comprises devising at least one of a route and a timing scheme based upon one or more of the number of robotic devices deployed and response times of the plurality of CRAC units.

14. The method according to claim 9, wherein the step of devising at least one of a route and a timing scheme based upon a routing algorithm comprises devising at least one of a route and a timing scheme based upon availability and efficiency studies of cooling system components and components housed in the room.

15. The method according to claim 9, wherein the step of devising at least one of a route and a timing scheme based upon a routing algorithm comprises devising at least one of a route and a timing scheme based upon substantially based on one or more of the reliabilities of components and service level agreements.

16. The method according to claim 9, further comprising:
    implementing a computational fluid dynamics tool to determine potential problem areas in the room; and
    wherein the step of devising a route based upon a routing algorithm comprises devising a route based upon an output of the computational fluid dynamics tool.

17. The method according to claim 1, wherein the at least one condition comprises an environmental condition, said method further comprising:

manipulating at least one cooling system component in response to the detected at least one environmental condition communicated from the robotic device.

18. The method according to claim 1, wherein the step of detecting at least one condition comprises tracking one or more components in the room, said method further comprising:
creating or updating an inventory of components in response to the detected at least one condition communicated from the robotic device.

19. The method according to claim 1, further comprising:
charging a battery of the robotic device at the base station in response to a determination that the battery of the robotic device requires charging.

20. A system for data connectivity in a room with a robotic device, said system comprising:
a plurality of sensors positioned in various locations in the room, said sensors being configured to detect at least one condition;
a plurality of access points associated with one or more of the sensors located in respective vicinities of die plurality of access points, said plurality of access points being configured to receive the detected at least one condition from the associated one or more sensors;
a robotic device configured to traverse the room and to receive the detected at least one condition from the plurality of access points when the robotic device is in the respective vicinities of the plurality of access points; and
a base station configured to communicate with the robotic device when the robotic device is in a vicinity of the base station.

21. The system according to claim 20, wherein the robotic device is configured to communicate with a respective one of the plurality of access points when the robotic device is within a predetermined distance to the respective one of the plurality of access points.

22. The system according to claim 21, wherein the predetermined distance comprises a range of between approximately 1-4 feet.

23. The system according to claim 21, further comprising:
a plurality of electronic components positioned at various locations of the room; and
wherein said plurality of sensors are further configured to detect the at least one condition in areas around respective ones of the plurality of electronic components.

24. The system according to claim 23, wherein the plurality of electronic components are housed in one or more racks, and wherein the sensors are configured to detect the at least one condition in areas around respective ones of the one or more racks.

25. The system according to claim 20, further comprising:
a beacon associated with respective ones of the plurality of access points, wherein said plurality of access points are configured to activate a respective beacon in response to receipt of the at least one condition detected by associated sensors.

26. The system according to claim 25, further comprising:
one or more cameras mounted at various locations of the room, the one or more cameras being configured to detect activation of the beacons, wherein the one or more cameras are configured to communicate detection of the activated beacons to the robotic device, and wherein the robotic device is configured to travel to a location in the vicinity of the access point that activated the beacon.

27. The system according to claim 25, wherein the robotic device comprises a camera configured to detect activation of the beacons, and wherein the robotic device is configured to travel to a location in the vicinity of the access point that activated the beacon.

28. The system according to claim 20, wherein the plurality of sensors comprise RFID devices configured to transmit information to distances within approximately 1-4 feet.

29. The system according to claim 20, wherein the base station is configured to devise a route far the robotic device to follow in visiting the respective locations in the vicinities of the plurality of access points, and wherein the base station is configured to communicate the devised route to the robotic device.

30. The system according to claim 20, wherein the robotic device is configured to devise a route for the robotic device to follow in visiting the respective locations in the vicinities of the plurality of access points.

31. The system according to claim 20, further comprising:
cooling system components; and
wherein the base station is configured to manipulate the cooling system components based upon the at least one detected condition communicated from the robotic device.

32. The system according to claim 20, wherein the base station is configured to create or update an inventory of components housed in the room based upon the at least one detect the condition communicated from the robotic device.

33. The system according to claim 20, wherein the base station further comprises a recharging station for charging a battery of the robotic device.

34. A system for data connectivity in a room, said system comprising:
means for detecting at least one condition;
means for communicating the detected at least one condition to associated access points;
means for selecting one or more access points;
means for collecting information, the means for collecting information comprising means for maneuvering the means for collecting information to a location in a vicinity of one or more of the selected access points;
means for communicating the detected at least one condition from one or more of the selected access points to the means for collecting information;
the means for collecting information further comprising means for maneuvering the means for collecting information to a location in a vicinity of a means for controlling the room; and
means for communicating the detected at least one condition from the means for collecting information to the means for controlling the room.

35. The system according to claim 34, further comprising:
means for indicating receipt of the detected at least one condition;
means for detecting the means for indicating; and
means for selecting the access point associated with the means for indicating.

36. The system according to claim 34, wherein the means for communicating the detected at least one condition from one or more of the selected access points to the means for collecting information further comprises means for communicating the detected at least one condition when the means for collecting information is in a vicinity of the one or more of the selected access points.

37. The system according to claim 34, wherein the means for communicating the detected at least one condition from the means for collecting information to the means for controlling the room further comprises means for communicating the detected at least one condition when the means for collecting information is in a vicinity of the means for controlling the room.

38. The system according to claim 34, further comprising:
means for devising a route for the means for collecting information, said means for devising including a routing algorithm.

39. The system according to claim 38, wherein the means for controlling the room comprises the means for devising a route, the system further comprising:
means for communicating a route devised by the means for devising to the means for collecting information.

40. The system according to claim 34, further comprising:
means for manipulating at least one cooling system component in response to detected at least one condition communicated from the means for collecting information.

41. The system according to claim 34, further comprising:
means for creating or updating an inventory of components in response to the detected at least one condition communicated from the means for collecting information.

42. The system according to claim 34, further comprising:
means for charging a battery of the means for collecting information.

43. A computer readable storage medium on which is embedded one or more computer programs, said one or more computer programs implementing a method for data connectivity in a room with a robotic device, said one or more computer programs comprising a set of instructions for:
detecting at least one condition with a plurality of sensors;
communicating the detected at least one condition from the sensors to associated access points;
selecting one or more access points;
maneuvering the robotic device to a location in a vicinity of one or more of the selected access points;
communicating the detected at least one condition from one or more of the selected access points to the robotic device;
maneuvering the robotic device to a location in a vicinity of a base station; and
communicating the detected at least one condition from the robotic device to the base station.

44. The computer readable storage medium according to claim 43, said one or more computer programs further comprising a set of instructions for:
activating a beacon in response to receipt of the detected at least one condition from the sensors;
detecting the activated beacon; and
wherein the step of selecting one or more access points comprises selecting the access point associated with the activated beacon.

45. The computer readable storage medium according to claim 43, said one or mare computer programs further comprising a set of instructions for:
selecting a plurality of access points;
maneuvering the robotic device to the vicinities of selected ones of the plurality of access points; and
communicating the detected at least one condition from the selected ones of the plurality of access points to the robotic device prior to the step of maneuvering the robotic device to the location in a vicinity of the base station.

46. The computer readable storage medium according to claim 45, said one or more computer programs further comprising a set of instructions for:
devising a route for the robotic device to follow in visiting download locations of the selected ones of the plurality of access points.

47. The computer readable storage medium according to claim 46, said one or more computer programs further comprising a set of instructions for:
categorizing the plurality of access points into a plurality of groups; and
devising a route based upon the categorization of the plurality of access points.

48. The computer readable storage medium according to claim 46, said one or more computer programs further comprising a set of instructions for:
implementing a computational fluid dynamics tool to determine potential problem areas in the room; and
devising a route bused upon an output of the computational fluid dynamics tool.

49. The computer readable storage medium according to claim 43, said one or more computer programs further comprising a set of instructions for:
manipulating at least one cooling system component in response to the detected at least one condition communicated from the robotic device.

50. The computer readable storage medium according to claim 43, said one or more computer programs further comprising a set of instructions for:
creating or updating an inventory of components in response to the detected at least one condition communicated from the robotic device.

* * * * *

UNITED STATES PATENT AND TRADEMARK OFFICE
CERTIFICATE OF CORRECTION

| | | |
|---|---|---|
| PATENT NO. | : 7,313,461 B2 | Page 1 of 1 |
| APPLICATION NO. | : 10/721264 | |
| DATED | : December 25, 2007 | |
| INVENTOR(S) | : Ratnesh K. Sharma et al. | |

It is certified that error appears in the above-identified patent and that said Letters Patent is hereby corrected as shown below:

In column 29, line 44, in Claim 3, delete "die" and insert -- the --, therefor.

In column 31, line 21, in Claim 20, delete "die" and insert -- the --, therefor.

In column 32, line 11, in Claim 29, delete "far" and insert -- for --, therefor.

In column 34, line 6, in Claim 45, delete "mare" and insert -- more --, therefor.

In column 34, line 35, in Claim 48, delete "bused" and insert -- based --, therefor.

Signed and Sealed this

Twenty-seventh Day of May, 2008

JON W. DUDAS
*Director of the United States Patent and Trademark Office*